(12) United States Patent
Widmer et al.

(10) Patent No.: US 9,837,204 B2
(45) Date of Patent: Dec. 5, 2017

(54) COIL TOPOLOGIES FOR INDUCTIVE POWER TRANSFER

(71) Applicant: QUALCOMM Incorporated, San Diego, CA (US)

(72) Inventors: Hans Peter Widmer, Wohlenschwil (CH); Nicholas A. Keeling, Auckland (NZ); Jonathan Beaver, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 450 days.

(21) Appl. No.: 14/461,243

(22) Filed: Aug. 15, 2014

(65) Prior Publication Data

US 2015/0170833 A1    Jun. 18, 2015

Related U.S. Application Data

(60) Provisional application No. 61/917,280, filed on Dec. 17, 2013.

(51) Int. Cl.
*H01F 38/14*      (2006.01)
*B60L 11/18*     (2006.01)
(Continued)

(52) U.S. Cl.
CPC ............ *H01F 38/14* (2013.01); *B60L 11/182* (2013.01); *B60L 11/1809* (2013.01); *H02J 5/005* (2013.01); *H02J 7/025* (2013.01)

(58) Field of Classification Search
None
See application file for complete search history.

(56) References Cited

U.S. PATENT DOCUMENTS

2005/0116683 A1* 6/2005 Cheng ................ H01F 3/02
                                                320/108
2013/0270921 A1 10/2013 Boys et al.
(Continued)

FOREIGN PATENT DOCUMENTS

GB         2388716 A    11/2003
WO   WO-2008156025 A1   12/2008
(Continued)

OTHER PUBLICATIONS

Covic G.A., et al., "Inductive Power Transfer," Proceedings of the IEEE, Jun. 2013, vol. 101 (6), pp. 1276-1289.
(Continued)

*Primary Examiner* — Jared Fureman
*Assistant Examiner* — James Evans
(74) *Attorney, Agent, or Firm* — Knobbe, Martens, Olson & Bear, LLP

(57) ABSTRACT

This disclosure provides systems, methods and apparatus including a magnetic flux device configured to transmit or receive magnetic flux. In certain configurations, the magnetic flux device can include a first coil with a first layer and second layer, a second coil with a third layer and fourth layer, and a magnetically permeable material with the first coil extending over a first edge of the magnetically permeable material and the second coil extending over a second edge of the magnetically permeable material. In certain other configurations, the magnetic flux device can include a first conductive structure including a first coil and a second coil enclosing a first area and a second area, respectively. The magnetic flux device can further include a second conductive structure with at least a first planar portion of the first conductive structure being substantially coplanar with a second planar portion of the second conductive structure.

17 Claims, 30 Drawing Sheets

(51) Int. Cl.
    *H02J 5/00*         (2016.01)
    *H02J 7/02*         (2016.01)

(56) References Cited

U.S. PATENT DOCUMENTS

| | | |
|---|---|---|
| 2013/0293330 A1 | 11/2013 | Wu et al. |
| 2014/0327394 A1* | 11/2014 | Asselin .................. H01F 3/10 320/108 |
| 2016/0119036 A1* | 4/2016 | Yang .................. H04B 5/0037 343/788 |

FOREIGN PATENT DOCUMENTS

| | | |
|---|---|---|
| WO | WO-2012172813 A1 | 12/2012 |
| WO | WO-2013019122 A1 | 2/2013 |
| WO | WO-2013036146 A1 | 3/2013 |
| WO | WO-2013051947 A1 | 4/2013 |
| WO | WO-2013057913 A1 | 4/2013 |
| WO | WO-2013133254 A1 | 9/2013 |
| WO | WO-2013145647 A1 | 10/2013 |
| WO | WO-2014011059 A1 | 1/2014 |

OTHER PUBLICATIONS

Ni B., et al., "Design and comparison of parallel and series resonant topology in wireless power transfer," 8th IEEE Conference on Industrial Electronics and Applications (ICIEA), 2013, pp. 1832-1837.
International Search Report and Written Opinion—PCT/US2014/070011—ISA/EPO—dated Feb. 12, 2015.

\* cited by examiner

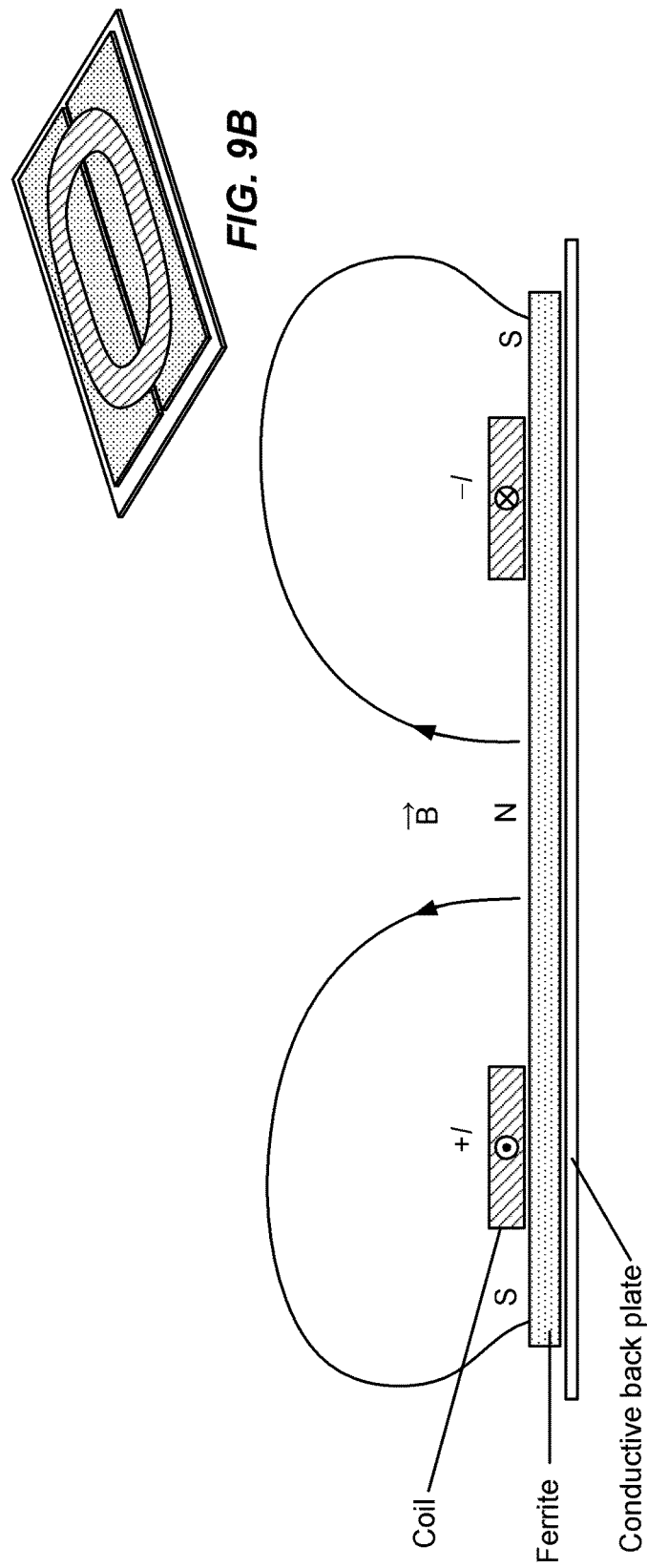

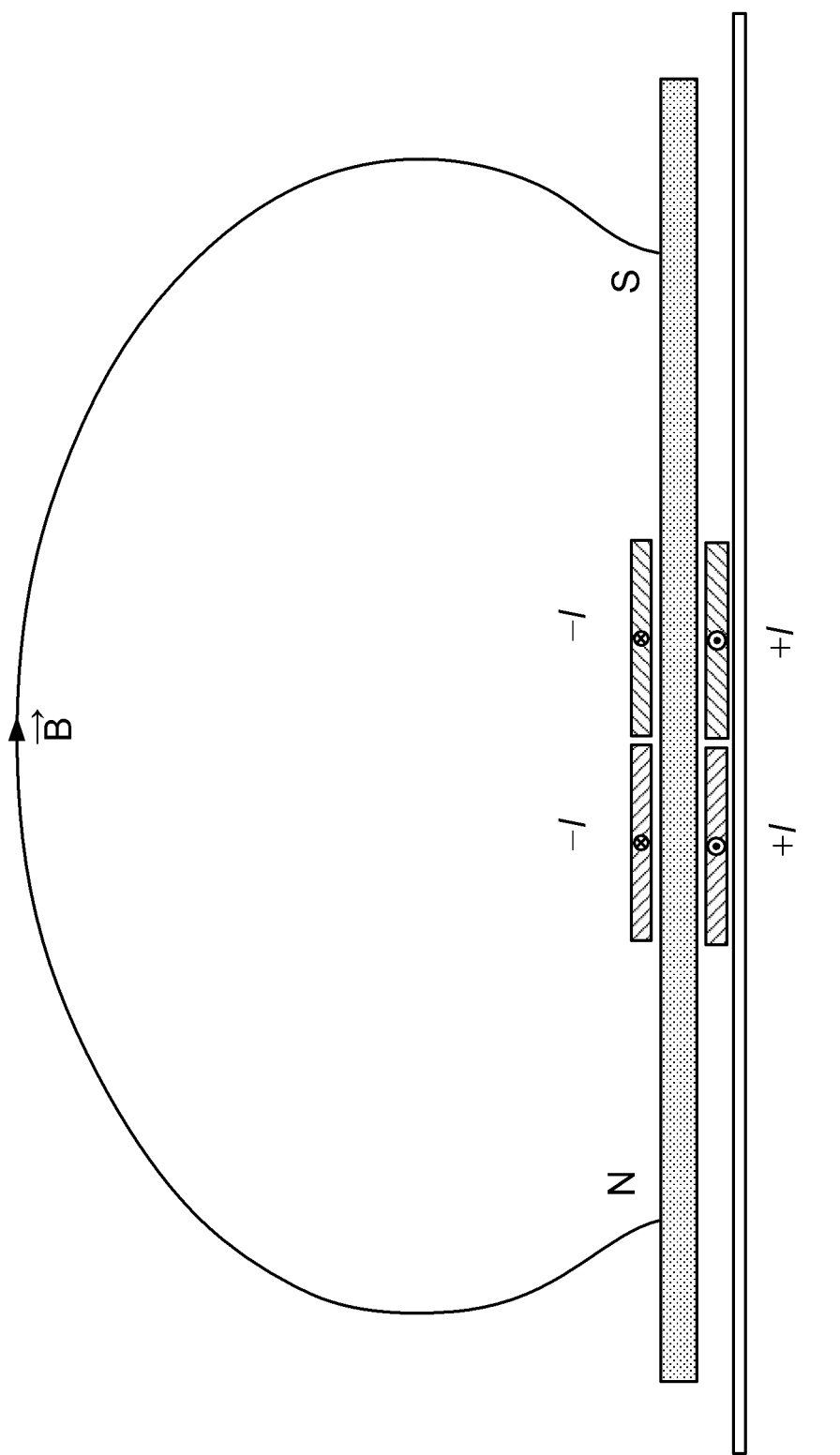

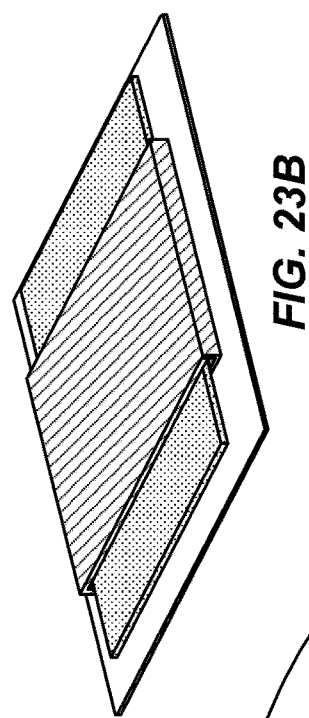
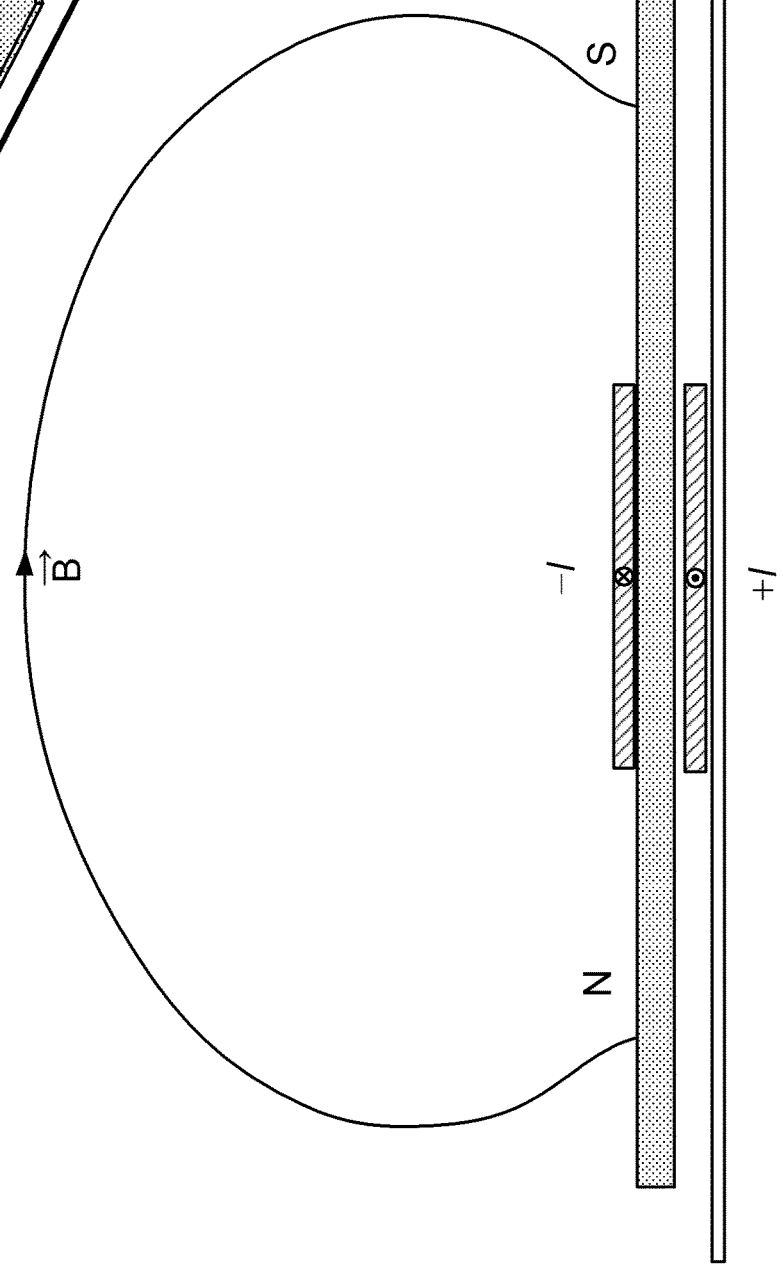
FIG. 23B
FIG. 23A

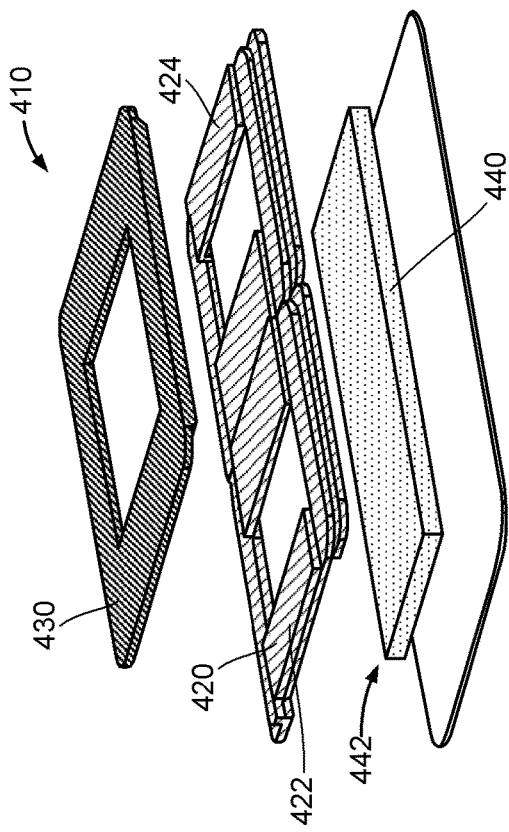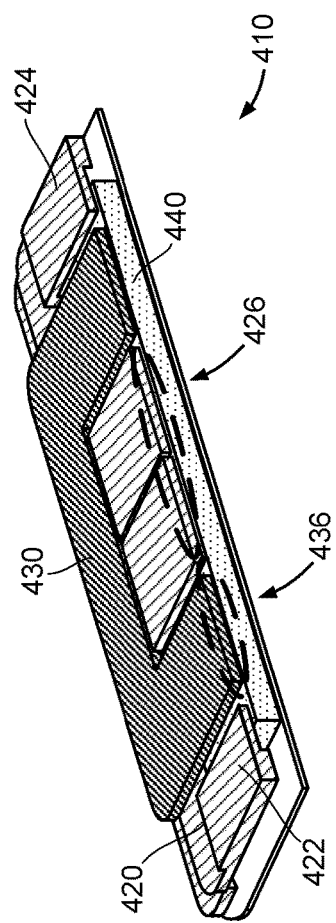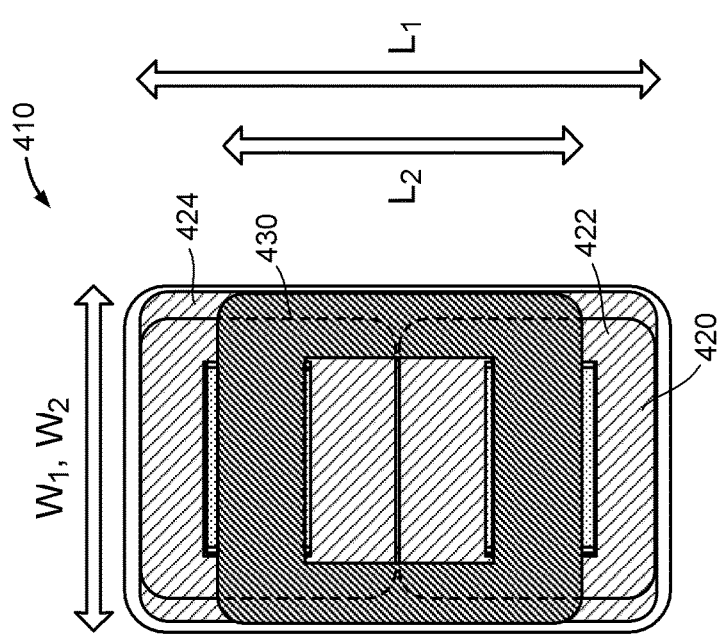

COIL TOPOLOGIES FOR INDUCTIVE POWER TRANSFER

RELATED APPLICATIONS

This application claims the benefit of priority to U.S. Provisional Appl. No. 61/917,280, filed Dec. 17, 2013 and incorporated in its entirety by reference herein.

FIELD

The present disclosure relates generally to wireless power transfer, and more specifically to devices, systems, and methods related to wireless power transfer to remote systems such as electric vehicles, and coupler coil topologies.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a magnetic flux device configured to transmit or receive magnetic flux to or from a space beyond the magnetic flux device. The magnetic flux device comprises at least a first electrically conductive coil and a second electrically conductive coil. The first coil has a first layer and second layer. The second coil has a third layer and fourth layer. The first layer is substantially coplanar with the third layer. The magnetic flux device further comprises a magnetically permeable material having a substantially planar first surface, a second surface adjoined to the first surface at a first edge, and a third surface adjoined to the first surface at a second edge. The first coil extends over the first edge and intersects a plane of the first surface. The second coil extends over the second edge and intersects the plane of the first surface.

Another aspect of the disclosure provides a magnetic flux device for wirelessly receiving or transmitting power from or to a space beyond the magnetic flux device. The magnetic flux device comprises a first conductive structure configured to wirelessly receive or transmit power via a magnetic field. The first conductive structure comprises a first coil having a first lower surface and a second coil having a second lower surface, the first lower surface substantially coplanar with the second lower surface. The first conductive structure has a first length and a first width both substantially parallel to the first and second lower surfaces, with the first length greater than the first width. The magnetic flux device further comprises a second conductive structure configured to wirelessly receive or transmit power via the magnetic field. The second conductive structure has a second length and a second width both substantially parallel to the first and second lower surfaces. The second length is substantially parallel to the first length and is greater than the second width. At least a first planar portion of the first conductive structure is substantially coplanar with a second planar portion of the second conductive structure.

Another aspect of the disclosure provides a magnetic flux device configured to transmit or receive magnetic flux to or from a space beyond the magnetic flux device. The magnetic flux device comprises at least a first electrically conductive coil and a second electrically conductive coil. The first coil is substantially planar and has a first periphery bounding a first area. The second coil is substantially planar and has a second periphery bounding a second area. The second coil is substantially coplanar with the first coil. The magnetic flux device further comprises a magnetically permeable material having a substantially planar surface and having a third periphery bounding a third area. The first coil and the second coil are substantially parallel to the substantially planar surface. A ratio of a sum of the first area and the second area to the third area is in a range between 0.9 and 1.1.

Another aspect of the disclosure provides a method for transmitting or receiving magnetic flux. The method comprises flowing at least one electric current using at least a first electrically conductive coil and a second electrically conductive coil. The first coil has a first layer and second layer. The second coil has a third layer and fourth layer. The first layer is substantially coplanar with the third layer. The method further comprises modifying magnetic flux generated by the at least one electric current or which generates the at least one electric current. The magnetic flux is modified using a magnetically permeable material having a substantially planar first surface, a second surface adjoined to the first surface at a first edge, and a third surface adjoined to the first surface at a second edge. The first coil extends over the first edge and intersects a plane of the first surface. The second coil extends over the second edge and intersects the plane of the first surface.

Another aspect of the disclosure provides a magnetic flux device configured to transmit or receive magnetic flux to or from a space beyond the magnetic flux device. The magnetic flux device comprises means for flowing at least one electric current and means for modifying magnetic flux generated by the at least one electric current or which generates the at least one electric current. The flowing means can comprise at least a first electrically conductive coil and a second electrically conductive coil. The first coil has a first layer and second layer. The second coil has a third layer and fourth layer. The first layer is substantially coplanar with the third layer. The modifying means can comprise a magnetically permeable material having a substantially planar first surface, a second surface adjoined to the first surface at a first edge, and a third surface adjoined to the first surface at a second edge. The first coil extends over the first edge and intersects a plane of the first surface. The second coil extends over the second edge and intersects the plane of the first surface.

Another aspect of the disclosure provides a method for transmitting or receiving magnetic flux. The method comprises flowing at least one first electric current using at least a first conductive structure configured to wirelessly receive or transmit power via a magnetic field. The first conductive structure comprises a first coil having a first lower surface and a second coil having a second lower surface, the first lower surface substantially coplanar with the second lower surface. The first conductive structure has a first length and a first width both substantially parallel to the first and second lower surfaces, with the first length greater than the first width. The method further comprises flowing at least one second electric current using at least a second conductive structure configured to wirelessly receive or transmit power via the magnetic field. The second conductive structure has a second length and a second width both substantially parallel to the first and second lower surfaces. The second length is substantially parallel to the first length and is greater than the second width. At least a first planar portion of the first conductive structure is substantially coplanar with a second planar portion of the second conductive structure.

Another aspect of the disclosure provides a magnetic flux device for wirelessly receiving or transmitting power from or to a space beyond the magnetic flux device. The magnetic flux device comprises first means for flowing at least one first electric current. The first flowing means can comprise a first conductive structure configured to wirelessly receive or transmit power via a magnetic field. The first conductive structure comprises a first coil having a first lower surface and a second coil having a second lower surface, the first lower surface substantially coplanar with the second lower surface. The first conductive structure has a first length and a first width both substantially parallel to the first and second lower surfaces, with the first length greater than the first width. The magnetic flux device further comprises second means for flowing at least one second electric current. The second flowing means can comprise a second conductive structure configured to wirelessly receive or transmit power via the magnetic field. The second conductive structure has a second length and a second width both substantially parallel to the first and second lower surfaces. The second length is substantially parallel to the first length and is greater than the second width. At least a first planar portion of the first conductive structure is substantially coplanar with a second planar portion of the second conductive structure.

Another aspect of the disclosure provides a method for transmitting or receiving magnetic flux. The method comprises flowing at least one electric current using at least a first electrically conductive coil and a second electrically conductive coil. The first coil is substantially planar and has a first periphery bounding a first area. The second coil is substantially planar and has a second periphery bounding a second area. The second coil is substantially coplanar with the first coil. The method further comprises modifying magnetic flux generated by the at least one electric current or which generates the at least one electric current. The magnetic flux is modified using a magnetically permeable material having a substantially planar surface and having a third periphery bounding a third area. The first coil and the second coil are substantially parallel to the substantially planar surface. A ratio of a sum of the first area and the second area to the third area is in a range between 0.9 and 1.1.

Another aspect of the disclosure provides a magnetic flux device configured to transmit or receive magnetic flux to or from a space beyond the magnetic flux device. The magnetic flux device comprises means for flowing at least one electric current. The flowing means can comprise at least a first electrically conductive coil and a second electrically conductive coil. The first coil is substantially planar and has a first periphery bounding a first area. The second coil is substantially planar and has a second periphery bounding a second area. The second coil is substantially coplanar with the first coil. The magnetic flux device further comprises means for modifying the magnetic flux generated by the at least one electric current or which generates the at least one electric current. The modifying means can comprise a magnetically permeable material having a substantially planar surface and having a third periphery bounding a third area. The first coil and the second coil are substantially parallel to the substantially planar surface. A ratio of a sum of the first area and the second area to the third area is in a range between 0.9 and 1.1.

Another aspect of the disclosure provides a magnetic flux device configured to transmit or receive magnetic flux to or from a space beyond the magnetic flux device. The magnetic flux device comprises means for wirelessly transmitting or receiving power comprising a first means for conducting current and a second means for conducting current. The first means for conducting current has a first layer and second layer. The second means for conducting current has a third layer and fourth layer. The first layer is substantially coplanar with the third layer. The magnetic flux device further comprises means for channeling magnetic flux having a substantially planar first surface, a second surface adjoined to the first surface at a first edge, and a third surface adjoined to the first surface at a second edge. The first means for conducting current extends over the first edge and intersects a plane of the first surface. The second means for conducting current extends over the second edge and intersects the plane of the first surface.

BRIEF DESCRIPTION OF THE DRAWINGS

FIG. 9A schematically illustrates the cross-section of a so-called "circular"-type coupler comprising a "circular"-type coil structure, a ferrite structure, and a conductive back plate, as well as the typical directions of currents and lines of magnetic field for this coil topology.

FIG. 9B shows a perspective view of a "circular"-type coupler model in accordance with FIG. 9A with a rectangular-shaped coil having rounded corners (e.g., an 'O'-shaped coil).

FIG. 22 schematically illustrates the cross-section of an IPT coupler topology using two solenoid coils directly adjacent with currents in the same direction, which is termed the "double solenoid, adjacent windings" coupler topology.

FIG. 23A schematically illustrates the cross-section of an IPT coupler with the two coils merged into a single coil, which may be considered as the planar "solenoid"-type magnetic flux device.

FIG. 23B shows a perspective view of the planar "solenoid"-type coupler model in accordance with FIG. 23A.

FIGS. 27A-27C shows a transparent top down view, a perspective cut view, and an explosion view, respectively, of a model of a "cross-polar"-type coupler ("DDQ" coupler) that integrates both a "double-D" coil and a "circular" ('Q') coil.

Figure 1:
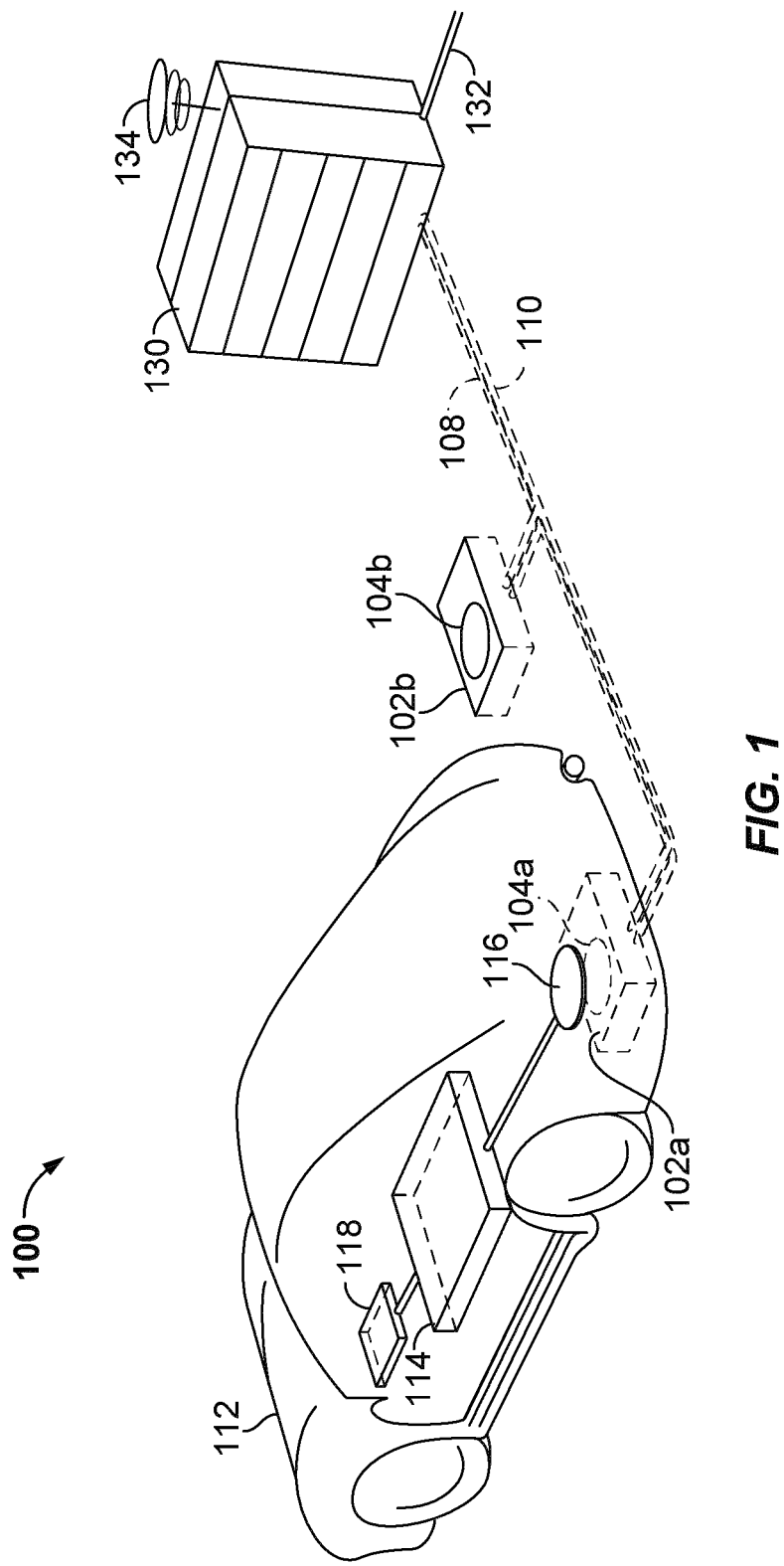
FIG. 1 is a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $1/2\pi$ of wavelength of the base system induction coil 104a (and vice versa for the electric vehicle induction coil 116) as will be further described below. Local distribution 1130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
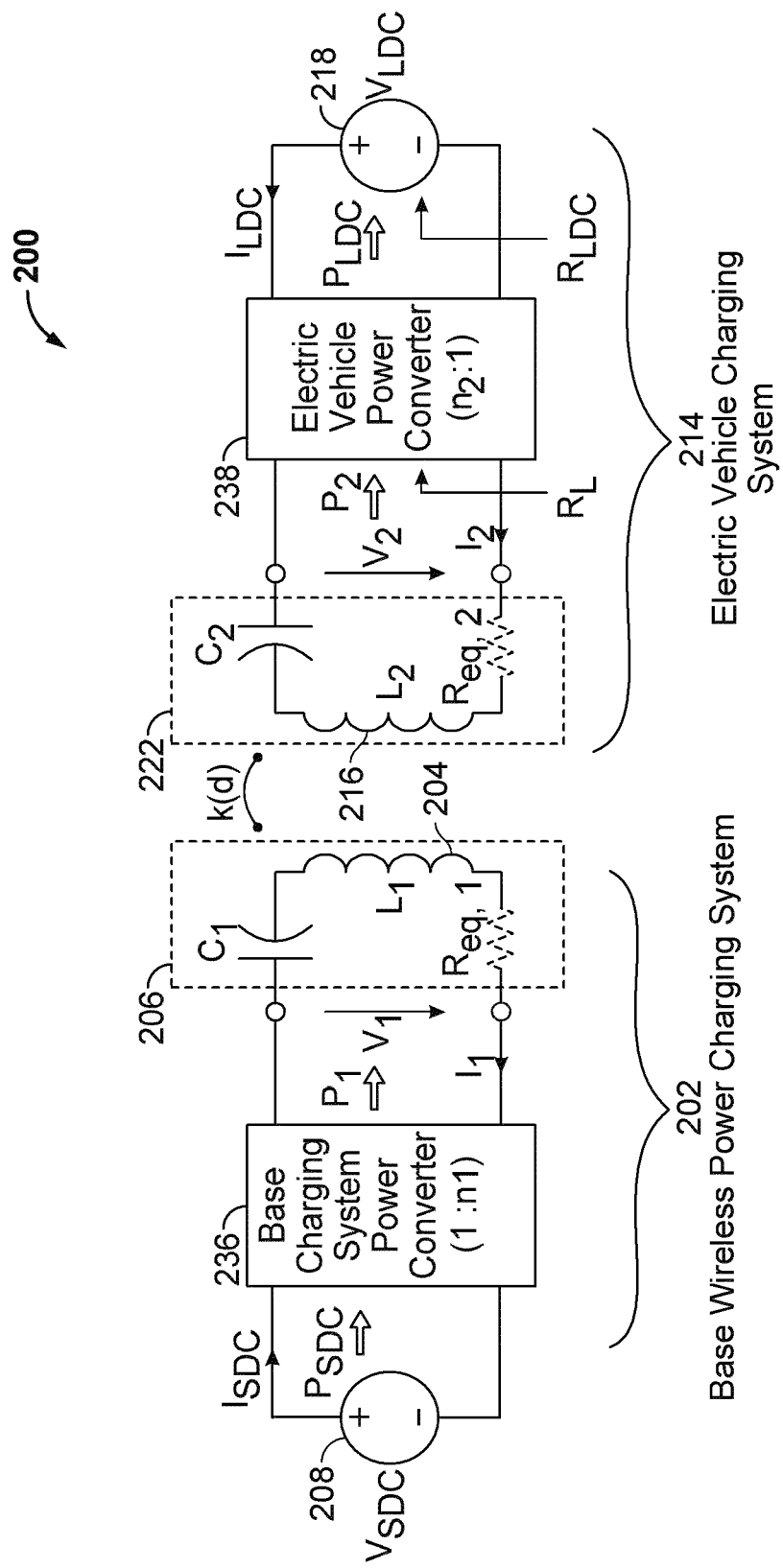
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 316 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coil" generally refers to a component that may wirelessly output or receive energy for coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high native quality (Q) factor to lower the losses of the induction coil and to increase efficiency of the inductive coupling system. For example, the native Q factor may be 300 or greater.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
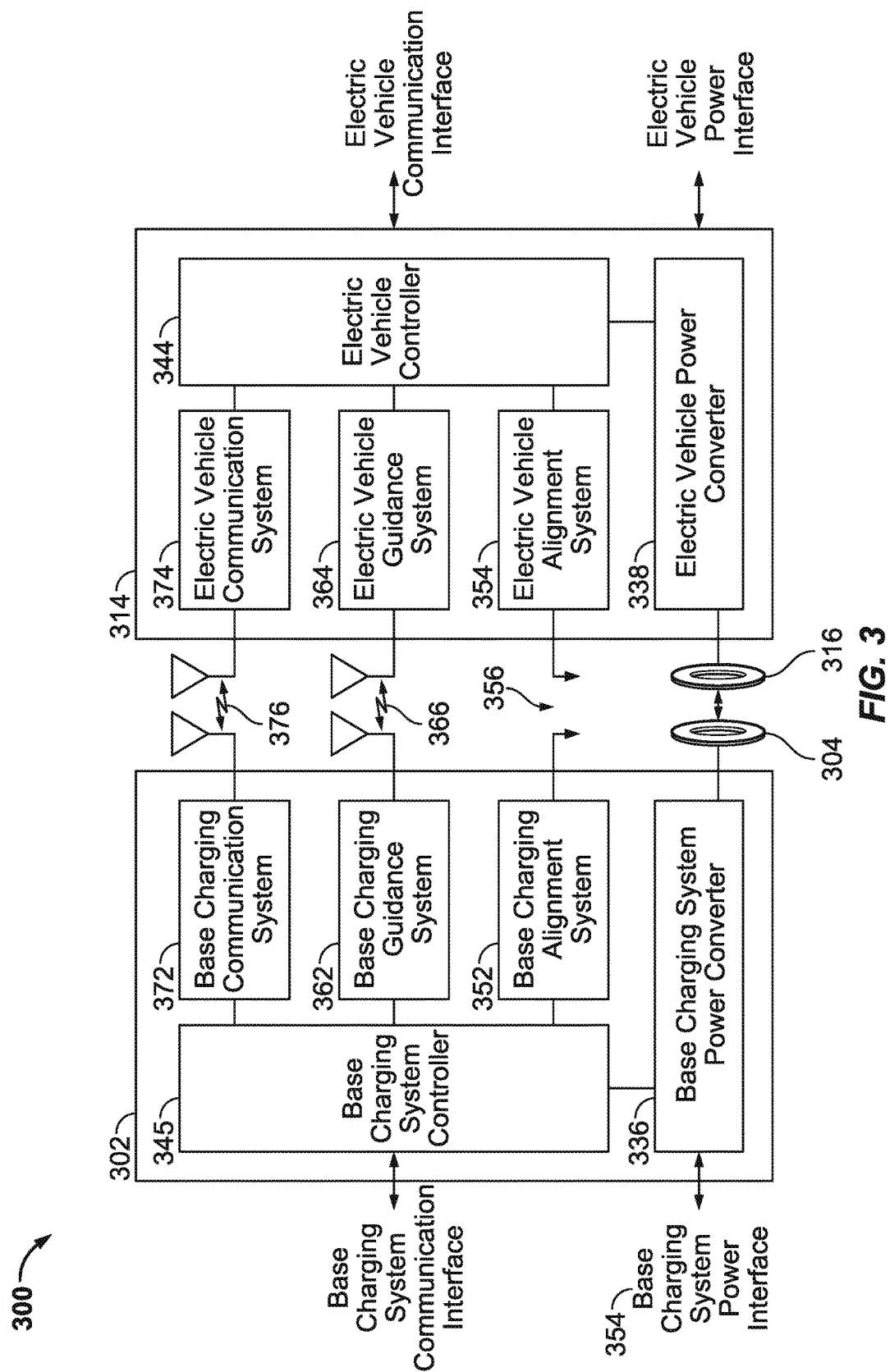
FIG. 3 is another functional block diagram showing exemplary core and ancillary components of the wireless power transfer system of FIG. 1.

FIG. 3 is another functional block diagram showing exemplary core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 354 may be configured to provide power to a charging system power converter 336 from a power source, such as an AC or DC power supply 126. The base charging system power converter 336 may receive AC or DC power from the base charging system power interface 354 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 345 and the electric vehicle charging system 314 includes an electric vehicle controller

344. The base charging system controller 345 may include a base charging system communication interface 162 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 345 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102*a* and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104*a*, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104*a*. Detection of changes to the loading on the power amplifier may be monitored by the base charging system controller 345 for use in determining whether to enable the oscillator for transmitting energy, to communicate with an active receiver, or a combination thereof.

To enable wireless high power transfer, some embodiments may be configured to transfer power at a frequency in the range from 10-150 kHz and particularly in the range from 80-90 kHz. This low frequency coupling may allow highly efficient power conversion that may be achieved using solid state devices. In addition, there may be less coexistence issues with radio systems compared to other bands.

Figure 4:
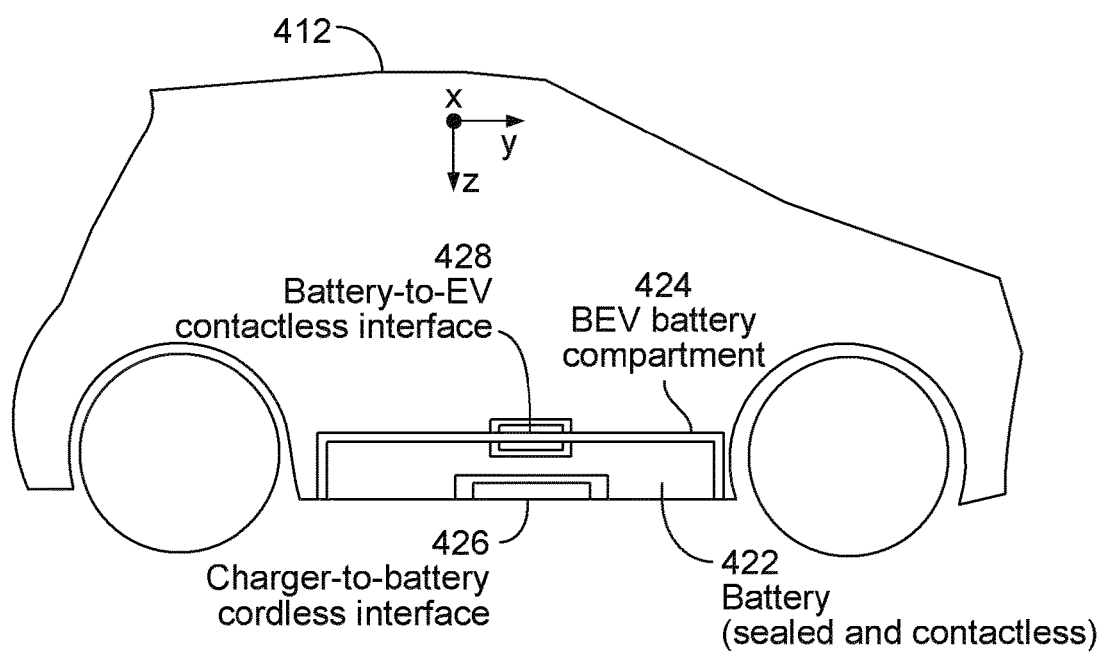
FIG. 4 is a functional block diagram showing a replaceable contactless battery disposed in an electric vehicle, in accordance with an exemplary embodiment of the invention.

The wireless power transfer system 100 described may be used with a variety of electric vehicles 102 including rechargeable or replaceable batteries. FIG. 4 is a functional block diagram showing a replaceable contactless battery disposed in an electric vehicle 412, in accordance with an exemplary embodiment of the invention. In this embodiment, the low battery position may be useful for an electric vehicle battery unit that integrates a wireless power interface (e.g., a charger-to-battery cordless interface 426) and that may receive power from a charger (not shown) embedded in the ground. In FIG. 4, the electric vehicle battery unit may be a rechargeable battery unit, and may be accommodated in a battery compartment 424. The electric vehicle battery unit also provides a wireless power interface 426, which may integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

It may be useful for the electric vehicle induction coil to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. The electric vehicle battery unit 422 may also include a battery-to-EV cordless interface 422, and a charger-to-battery cordless interface 426 that provides contactless power and communication between the electric vehicle 412 and a base wireless charging system 102a as shown in FIG. 1.

In some embodiments, and with reference to FIG. 1, the base system induction coil 104a and the electric vehicle induction coil 116 may be in a fixed position and the induction coils are brought within a near-field coupling region by overall placement of the electric vehicle induction coil 116 relative to the base wireless charging system 102a. However, in order to perform energy transfer rapidly, efficiently, and safely, the distance between the base system induction coil 104a and the electric vehicle induction coil 116 may need to be reduced to improve coupling. Thus, in some embodiments, the base system induction coil 104a and/or the electric vehicle induction coil 116 may be deployable and/or moveable to bring them into better alignment.

Figure 5A:
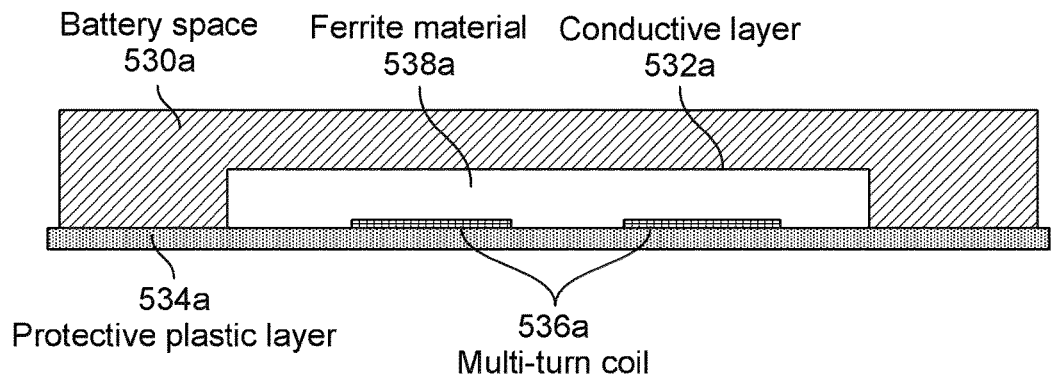
FIGS. 5A, 5B, 5C, and 5D are diagrams of exemplary configurations for the placement of an induction coil and ferrite material relative to a battery, in accordance with exemplary embodiments of the invention.

FIGS. 5A, 5B, 5C, and 5D are diagrams of exemplary configurations for the placement of an induction coil and ferrite material relative to a battery, in accordance with exemplary embodiments of the invention. FIG. 5A shows a fully ferrite embedded induction coil 536a. The wireless power induction coil may include a ferrite material 538a and a coil 536a wound about the ferrite material 538a. The coil 536a itself may be made of stranded Litz wire. A conductive shield 532a may be provided to protect passengers of the vehicle from excessive EMF transmission. Conductive shielding may be particularly useful in vehicles made of plastic or composites.

Figure 5B:
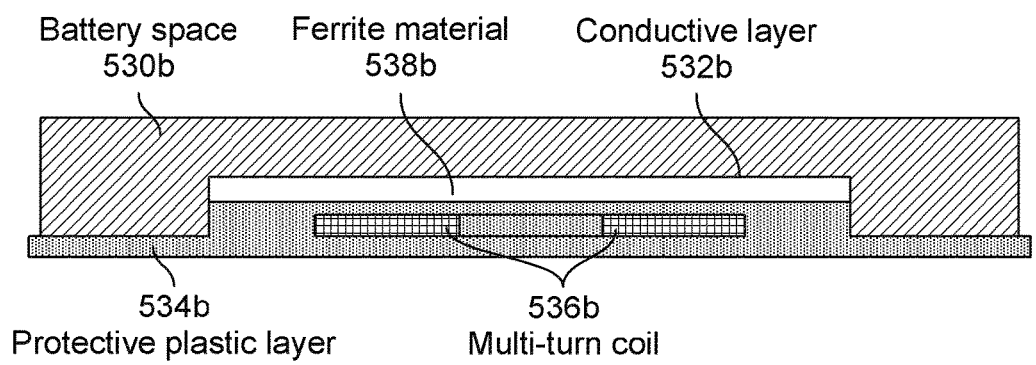

FIG. 5B shows an optimally dimensioned ferrite plate (i.e., ferrite backing) to enhance coupling and to reduce eddy currents (heat dissipation) in the conductive shield 532b. The coil 536b may be fully embedded in a non-conducting non-magnetic (e.g., plastic) material. For example, as illustrated in FIGS. 5A-5D, the coil 536b may be embedded in a protective housing 534b. There may be a separation between the coil 536b and the ferrite material 538b as the result of a trade-off between magnetic coupling and ferrite hysteresis losses.

Figure 5C:
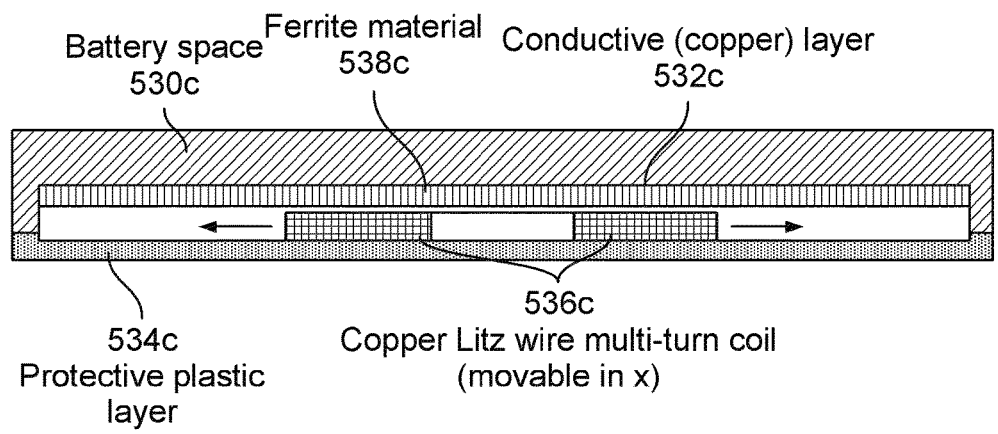
Figure 5D:
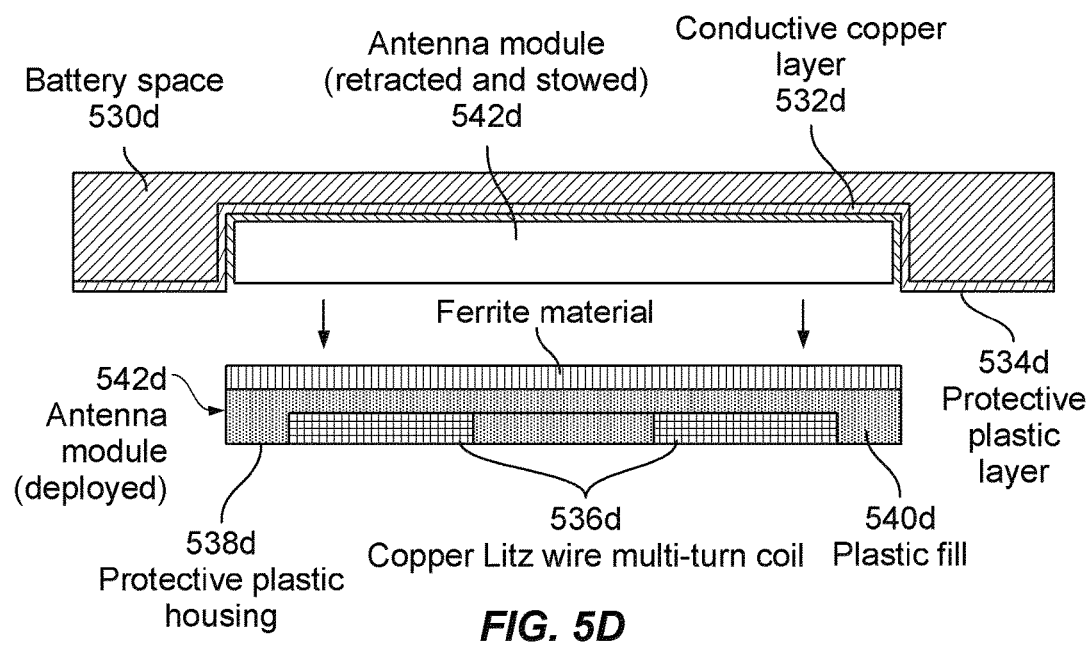

FIG. 5C illustrates another embodiment where the coil 536c (e.g., a copper Litz wire multi-turn coil) may be movable in a lateral ("X") direction. FIG. 5D illustrates another embodiment where the induction coil module is deployed in a downward direction. In some embodiments, the battery unit includes one of a deployable and non-deployable electric vehicle induction coil module 540d as part of the wireless power interface. To prevent magnetic fields from penetrating into the battery space 530d and into the interior of the vehicle, there may be a conductive shield 532d (e.g., a copper sheet) between the battery space 530d and the vehicle. Furthermore, a non-conductive (e.g., plastic) protective layer 533d may be used to protect the conductive shield 532d, the coil 536d, and the ferrite material 538d from environmental impacts (e.g., mechanical damage, oxidization, etc.). Furthermore, the coil 536d may be movable in lateral X and/or Y directions. FIG. 5D illustrates an embodiment wherein the electric vehicle induction coil module 540d is deployed in a downward Z direction relative to a battery unit body.

The design of this deployable electric vehicle induction coil module 542b is similar to that of FIG. 5B except there is no conductive shielding at the electric vehicle induction coil module 542d. The conductive shield 532d stays with the battery unit body. The protective layer 533d (e.g., plastic layer) is provided between the conductive shield 432d and the electric vehicle induction coil module 542d when the electric vehicle induction coil module 542d is not in a deployed state. The physical separation of the electric vehicle induction coil module 542 from the battery unit body may have a positive effect on the induction coil's performance.

As discussed above, the electric vehicle induction coil module 542d that is deployed may contain only the coil 536d (e.g., Litz wire) and ferrite material 538d. Ferrite backing may be provided to enhance coupling and to prevent from excessive eddy current losses in a vehicle's underbody or in the conductive shield 532d. Moreover, the electric vehicle induction coil module 542d may include a flexible wire connection to power conversion electronics and sensor electronics. This wire bundle may be integrated into the mechanical gear for deploying the electric vehicle induction coil module 542d.

With reference to FIG. 1, the charging systems described above may be used in a variety of locations for charging an electric vehicle 112, or transferring power back to a power grid. For example, the transfer of power may occur in a parking lot environment. It is noted that a "parking area" may also be referred to herein as a "parking space." To enhance the efficiency of a vehicle wireless power transfer system 100, an electric vehicle 112 may be aligned along an X direction and a Y direction to enable an electric vehicle induction coil 116 within the electric vehicle 112 to be adequately aligned with a base wireless charging system 102a within an associated parking area.

Furthermore, the disclosed embodiments are applicable to parking lots having one or more parking spaces or parking areas, wherein at least one parking space within a parking lot may comprise a base wireless charging system 102a. Guidance systems (not shown) may be used to assist a vehicle operator in positioning an electric vehicle 112 in a parking area to align an electric vehicle induction coil 116 within the electric vehicle 112 with a base wireless charging system 102a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 112 to enable an induction coil 116 within the electric vehicle 112 to be adequately aligned with a charging induction coil within a charging base (e.g., base wireless charging system 102a).

As discussed above, the electric vehicle charging system 114 may be placed on the underside of the electric vehicle 112 for transmitting and receiving power from a base wireless charging system 102a. For example, an electric vehicle induction coil 116 may be integrated into the vehicles underbody preferably near a center position providing maximum safety distance in regards to EM exposure and permitting forward and reverse parking of the electric vehicle.

Figure 6:
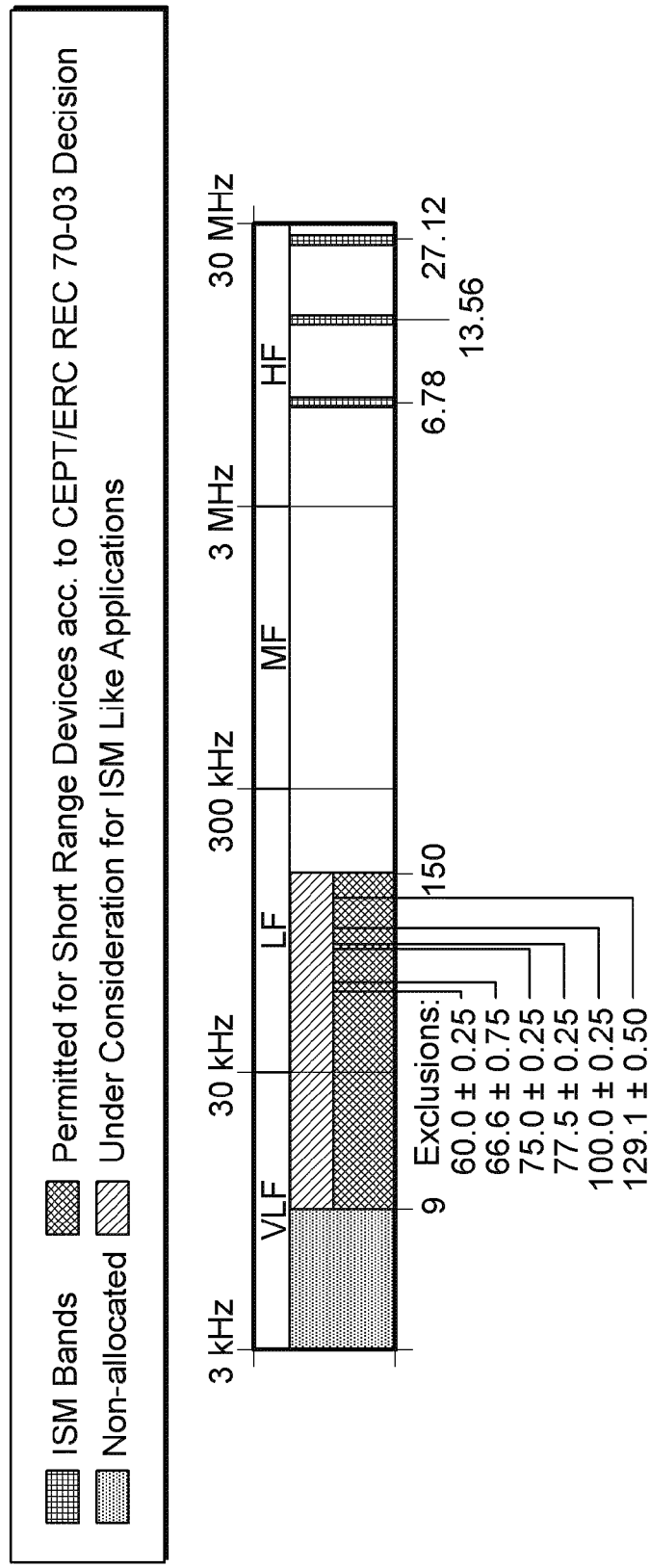
FIG. 6 is a chart of a frequency spectrum showing exemplary frequencies that may be available for wireless charging an electric vehicle, in accordance with an exemplary embodiment of the invention.

FIG. 6 is a chart of a frequency spectrum showing exemplary frequencies that may be used for wireless charging an electric vehicle, in accordance with an exemplary embodiment of the invention. As shown in FIG. 6, potential frequency ranges for wireless high power transfer to electric vehicles may include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 7:
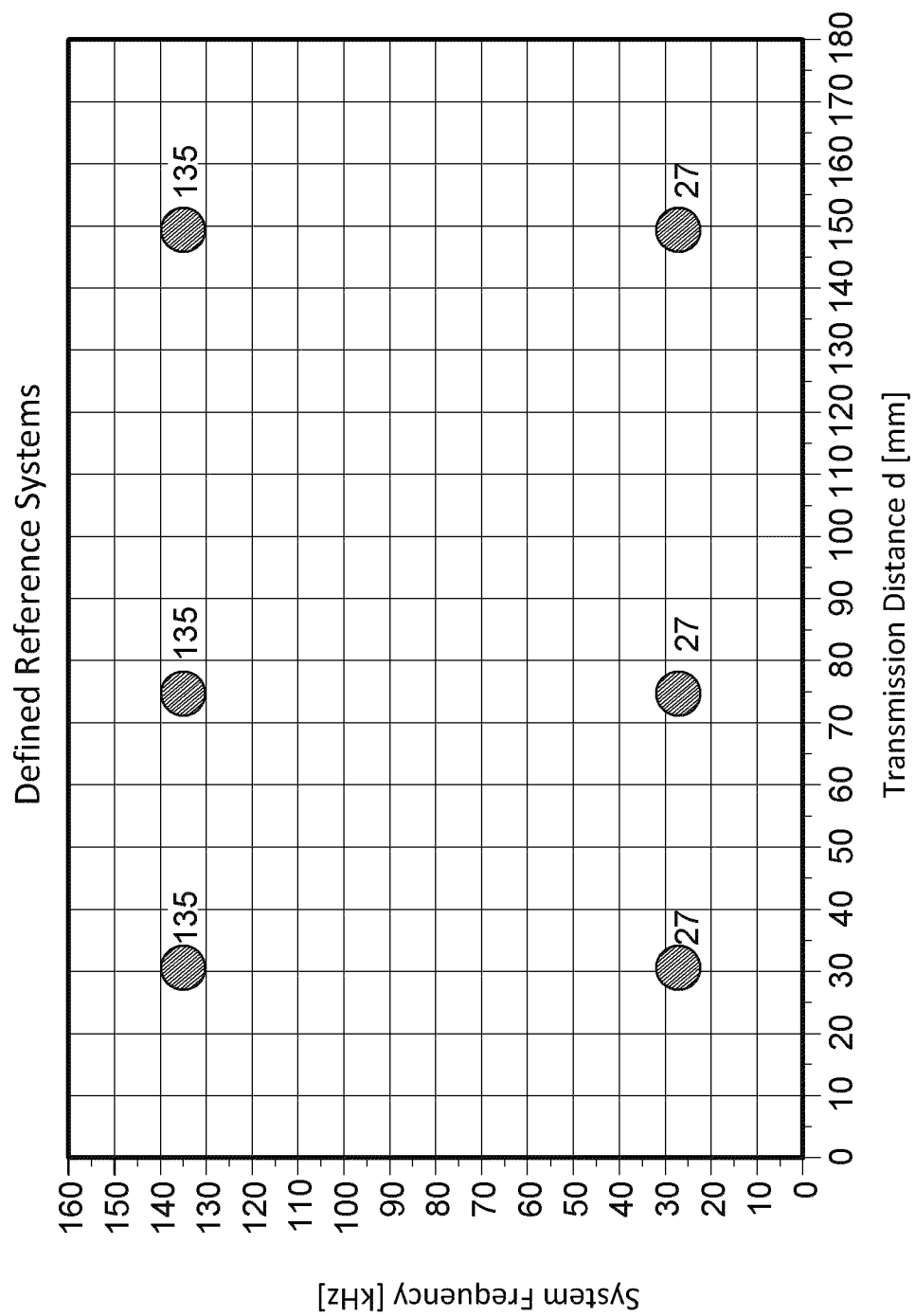
FIG. 7 is a chart showing exemplary frequencies and transmission distances that may be useful in wireless charging electric vehicles, in accordance with an exemplary embodiment of the invention.

FIG. 7 is a chart showing exemplary frequencies and transmission distances that may be useful in wireless charging electric vehicles, in accordance with an exemplary embodiment of the invention. Some example transmission distances that may be useful for electric vehicle wireless charging are about 30 mm, about 75 mm, and about 150 mm. Some exemplary frequencies may be about 27 kHz in the VLF band and about 135 kHz in the LF band.

Inductive power transfer (IPT) systems provide one example of wireless transfer of energy. In IPT systems, a primary (or "transmitter") power device transmits power to a secondary (or "receiver") power receiver device. Each of the transmitter and receiver power devices includes an inductive coupler, e.g., a single coil or a multi-coil arrangement of windings of electric current conveying media. An alternating current in the primary inductor produces an alternating magnetic field. When the secondary inductor is placed in proximity to the primary inductor, the alternating magnetic field induces an electromotive force (EMF) in the secondary inductor (Faraday's law), thereby transferring power to the secondary power receiver device.

A planar IPT coupler that may be also called an IPT magnetic flux device typically comprises a low profile planar coil structure for generating or picking-up magnetic flux, a ferrite backing or core structure, and a conductive back plate for purposes of magnetic flux shaping and shielding. The ferrite structure may comprise ferrite tiles assembled virtually without gaps (e.g., constituting a monolithic block) or it may comprise ferrite slabs with gaps between the slabs with a main direction of flux parallel to the long side of the slabs. The conductive pack plate can facilitate achieving the particular boundary conditions desired for the magnetic field in the space between ground and vehicle underbody.

Various different planar coil coupler topologies have been proposed for inductive power transfer (IPT) from a ground-based charging unit to an electric vehicle. These coupler topologies include, but are not limited to: "circular"-type (e.g., single coil on top of a ferrite structure, such as a ferrite backing; see, e.g., U.S. patent application Ser. No. 12/451,436, "Multi-sourced electric vehicle pick-up"); "solenoid"-type (e.g., single coil wound around a ferrite structure, such as a ferrite core; see, e.g., U.S. patent application Ser. No. 13/138,299, "Inductive power transfer apparatus"); "double-coil"-type (e.g., two coils essentially on top of a ferrite structure, such as a ferrite backing; see, e.g., U.S. patent application Ser. No. 13/138,298, "Inductive power transfer apparatus"); and variants thereof (e.g., "bi-polar"-type; see, e.g., U.S. patent application Ser. No. 13/389,090, "Bi-polar pad development"). In addition, other coil coupler topologies have been proposed for IPT that are combinations of these topologies with additional coils (e.g., U.S. patent application Ser. No. 13/791,538, "Wireless power transfer system coil arrangements and method of operation" which discloses an arrangement which combines a "double-D" structure with a "circular" structure).

If optimized and compared under the same size or volume constraint, these coupler topologies differ in performance characteristics such as coupling factor, tolerance to horizontal displacement and vertical displacement (e.g., offset and air gap height), native quality factor, and leakage flux densities in the immediate surrounding or in the vicinity of the vehicle in case of a vehicle installation (e.g., emissions).

Numerous computer simulations, as well as practical measurements of different coupler-type topologies and design variants have provided evidence that in certain implementations, "circular"-type coupler coils generally exhibit the weakest coupling and the least tolerance but the lowest emissions and highest Q-factor of certain coupler topologies relative to others, while "solenoid"-type coupler coils exhibit the strongest coupling and the largest tolerance, but the highest emission levels and lowest Q-factor of certain coupler topologies relative to others. "Double-coil"- or "double-D"-type coupler coils are somewhere between "circular"-type and "solenoid"-type coupler coils, making them particularly interesting as a topology that exhibits design trade-offs (e.g., between coupling performance and emissions).

This aspect of "double-coil"-type coupler coils may be explained by considering "double coil"-type coupler topologies as a stage of metamorphosis between the "circular"-type and "solenoid"-type topologies. This description of the "double-coil"-type coupler topology as a metamorphosis of "circular"-type and "solenoid"-type coupler topologies can be helpful in understanding and explaining the characteristics of the various coupler topologies and to systematically select (e.g., control) these characteristics and to generate new coupler designs that exhibit a desired trade-off between the performance characteristics (e.g., between coupling factor and emissions).

Figure 8A:
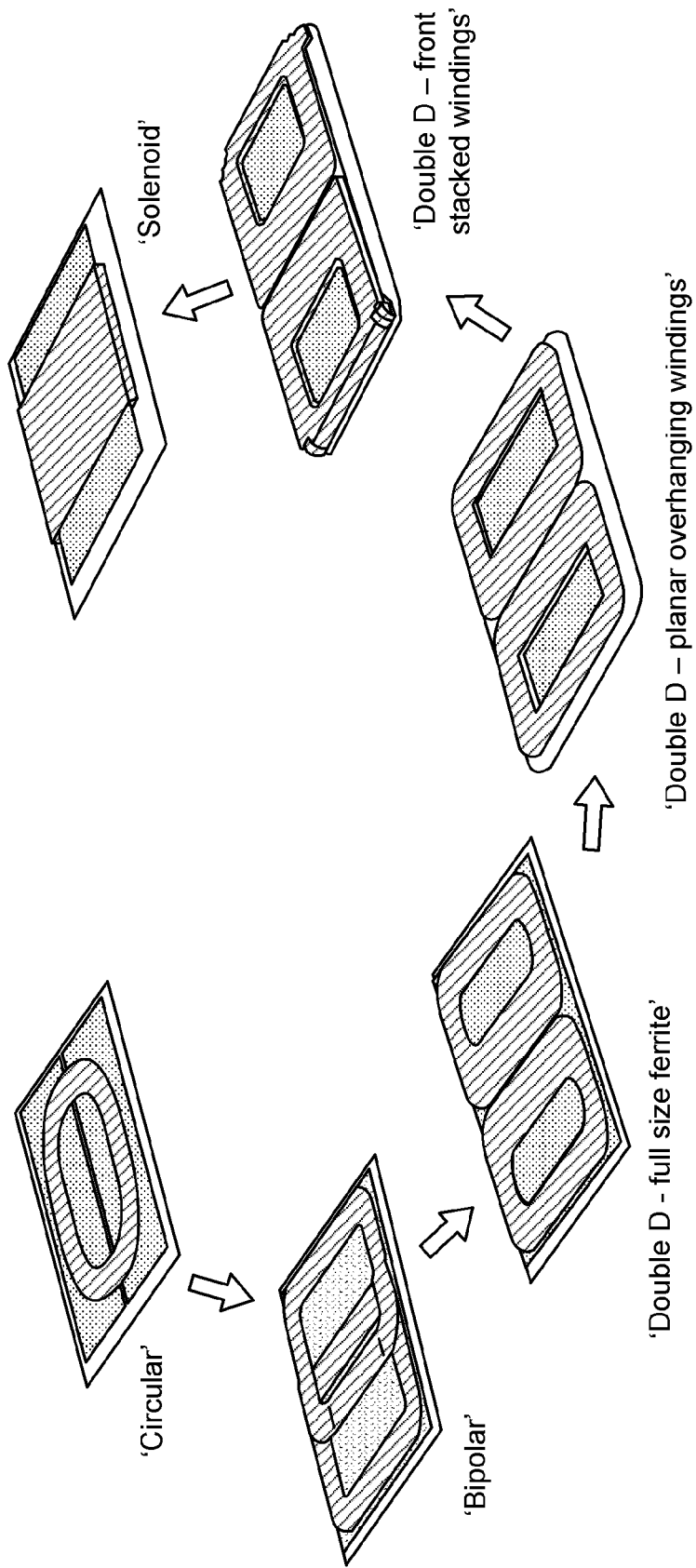
FIG. 8A shows a family of "double-coil"-type inductive power transfer (IPT) coupler designs that may be considered as having been generated by a process of metamorphosis of a "circular"-type coupler towards a "solenoid"-type coupler.

FIG. 8A shows a family of "double-coil"-type coupler designs whose members may be considered as intermediate stages of a process of metamorphosis of a "circular"-type coupler towards a "solenoid"-type coupler. Particularly, these coupler designs are the so-called "bi-polar" coupler and variants of the so-called "double-D" coupler, which are of particular interest.

Two coupler topologies are of particular interest: "double-D, full-size ferrite" coupler topology and the "double-D, front-stacked windings" coupler topology. The "double-D, full-size ferrite" coupler coil may be considered to be a variant of the "double-D"-type coupler coil, representing a trade-off in favor of emissions. The "double-D, front-stacked windings" coupler coil may be considered to be a variant of the "double-D"-type coupler coil, representing a trade-off in favor of coupling factor and tolerance to displacements. Using the "double-D, full-size ferrite" coupler coil in the base pad and the "double-D, front-stacked windings" coupler coil on the electric vehicle can provide a good solution for a small vehicle package that integrates both coupler coils and power electronics (e.g., rectifier). The concept of the "double-D, front-stacked windings" coupler coil is also useful if both a "double-D"-type coupler coil and a "quadrature"-type coupler coil has to be integrated into a small vehicle package with an optimum space utilization and good performance.

The "double-D, full-size ferrite" coupler (see, e.g., FIGS. 15A, 15B, and 25) can be a magnetic flux device 210 configured to transmit or receive magnetic flux to or from a space beyond the magnetic flux device 210. As used herein, the term "magnetic flux device" has its broadest reasonable interpretation, including but not limited to, a base pad, a vehicle pad, or other type of magnetic flux pad, and is not restricted to any particular shape, dimensions, or combination of components. As used herein, the term "pad" has its broadest reasonable interpretation, including but not limited to, a device (e.g., a base pad, a vehicle pad) configured for use in a wireless electric vehicle charging system, and is not restricted to any particular shape, dimensions, or combination of components. The magnetic flux device 210 comprises at least a first electrically conductive coil 220 and a second electrically conductive coil 230. The first coil 220 is substantially planar and has a first periphery bounding a first area. The second coil 230 is substantially planar and has a second periphery bounding a second area. The second coil 230 is substantially coplanar with the first coil 220. The magnetic flux device 210 further comprises a magnetically permeable material 240 having a substantially planar surface 242 and having a third periphery bounding a third area. The magnetically permeable material 240 is sometimes referred to herein as a "core." As used herein, the term "core" has its broadest reasonable interpretation, which in particular, is not to limited to being in a central location or being wrapped around by other components. The magnetically permeable material 240 can be magnetically associated with at least the first coil 220 and the second coil 230. The first coil 220 and the second coil 230 are substantially parallel to the substantially planar surface 242. A ratio of a sum of the first area and the second area to the third area is in a range between 0.9 and 1.1.

The "double-D, front-stacked windings" coupler (see, e.g., FIGS. 17A and 17B) can be a magnetic flux device 310 configured to transmit or receive magnetic flux to or from a space beyond the magnetic flux device 310. The magnetic flux device 310 comprises at least a first electrically conductive coil 320 and a second electrically conductive coil 330. The first coil 320 has a first layer 322 and second layer 324. The second coil 330 has a third layer 332 and fourth layer 334. The first layer 322 is substantially coplanar with the third layer 332. The magnetic flux device 310 further comprises a magnetically permeable material 340 having a substantially planar first surface 342, a second surface 343 adjoined to the first surface 342 at a first edge 346, and a third surface 348 adjoined to the first surface 342 at a second edge 350. The magnetically permeable material 340 can be magnetically associated with at least the first coil 320 and the second coil 330. The first coil 320 extends over the first edge 346 and intersects a plane of the first surface 342. The second coil 330 extends over the second edge 350 and intersects the plane of the first surface 342.

FIG. 8A shows a selection of "double-coil"-type coupler topologies for IPT which can be considered as having been generated through a process of metamorphosis that starts at the planar "circular" topology and that ends at the planar "solenoid" topology. This process of metamorphosis in general is schematically displayed in FIG. 8B. In an initial step, the "circular" coil is split into a first and a second coil. Then, one coil is moved to the left and the other coil is moved to the right. Moreover, both coils are stretched to the width of the ferrite structure. In following steps, coils are further stretched and pulled over the ferrite structure in a manner that the position of the inner segments (e.g., coil segments that are adjacent) remain fixed on the upper surface of the ferrite and outer segments (e.g., coil segments that are on opposite side) move to be beneath the ferrite structure, with the ferrite structure becoming a core with the coils wound around the core. In a next step, both coils are contracted in a manner that the outer coil segments move towards the center resulting in two separate but adjacent solenoid coils. Finally, the two solenoid coils are merged into a single solenoid. For reasons of comparability of performance, it can be assumed that all the couplers as generated by metamorphosis have equal form factors.

This process of metamorphosis is also demonstrated in a sequence of schematic depictions starting at FIGS. 9A-9B and terminating at FIGS. 23A-23B. These schematic depictions show at least a cross-section view of the coupler structure and in some cases additionally a perspective (3D) view of the coupler. The cross-sections generally are not drawn to scale and should be considered qualitative.

FIG. 9A schematically illustrates the cross-section of a "circular" magnetic flux device (e.g., the magnetic flux device of FIG. 9B). FIG. 9A also indicates the magnetic pole area (N) in the center of the magnetic flux device and the opposite pole area (S) in the peripheral zone of the magnetic flux device and two characteristic field lines. As compared to the other topologies of FIGS. 8A-8B, in certain configurations, a pair of "circular" magnetic flux devices can exhibit the lowest coupling factor and tolerance, but the highest Q-factor and lowest emission levels (e.g., leakage flux), assuming the same size (form factor) and the same horizontal and vertical displacements for all topologies. The low emission levels may be explained by the fact that the vertical magnetic field components are effectively cancelled out by the conductive back plate (e.g., flux shaping effect) resulting in less stray flux outside the functional space of the IPT coupling system. The "circular" coupler may therefore be considered as one extreme in the sequence of topologies shown in FIGS. 8A-8B.

Figure 13B:
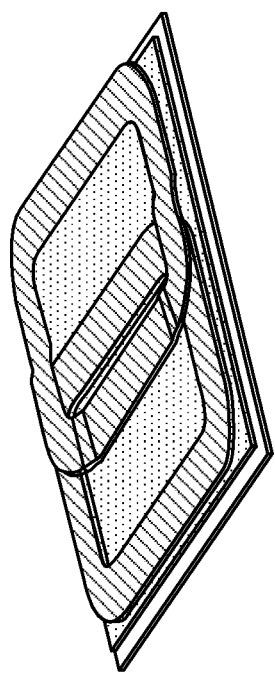
FIG. 13B shows a perspective view of an IPT coupler model in accordance with FIG. 13A, and more specifically, a so-called "bipolar"-type coupler that is characterized by two overlapping coils with coil A and coil B having substantially 'zero' mutual inductance.

FIGS. 10, 11, 12, and 13A-13B schematically illustrate steps 1, 2, 3, and 4 of a metamorphosis towards the "solenoid": the "circular" coil is split into coil A and coil B (see FIG. 10), coil A is moved to the left (see FIG. 11) and coil B to the right (see FIG. 12), and parts of coil A that do not overlap with coil B are lowered (e.g., adjusted) to the plane of coil B (see FIGS. 13A-13B), resulting in a double coil structure with overlapping coils and outer dimensions substantially equal to those of the ferrite structure. At a certain degree of overlapping, the so-called "bi-polar" magnetic flux device is encountered, characterized by virtually zero coupling between coil A and coil B. Zero coupling (e.g., zero mutual inductance) allows coils to be driven independently with currents of different magnitude and phase so that the "bi-polar" coupler can be operated in a vertical, horizontal, or mixed mode of polarization. A model of an exemplary embodiment of the "bi-polar" coupler is depicted in FIG. 13B.

Figure 13A:
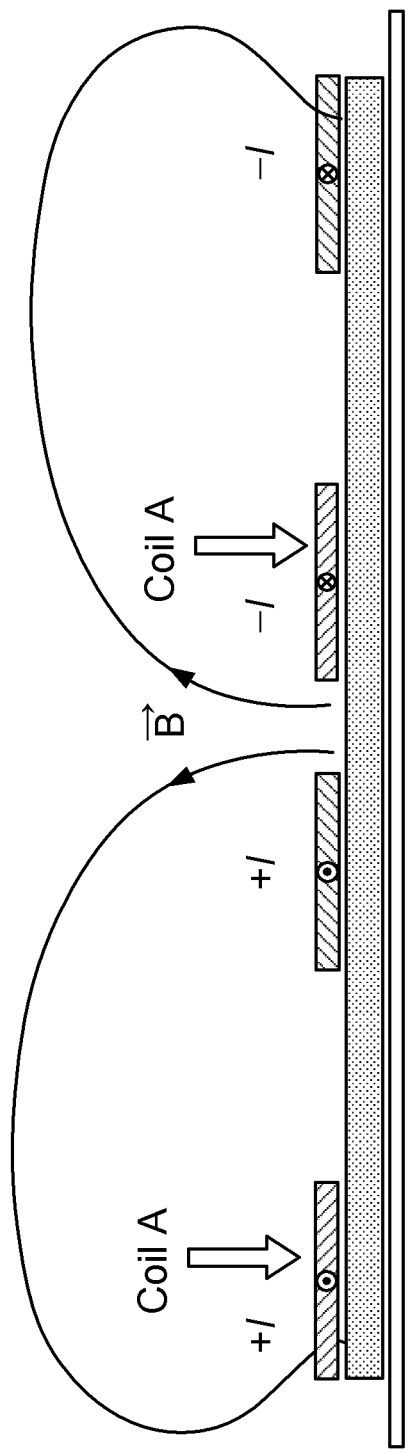
FIG. 13A schematically illustrates coil A lowered to the same plane as coil B, as well as the current directions and lines of magnetic field for a mode of operation that generates a 'vertical' magnetic moment.

If coil A and coil B are driven with equal current levels and current directions as shown in FIG. 13A, the "bi-polar" coupler acts like a "circular" coupler generating a vertical magnetic moment as indicated by the pole areas (N and S) and magnetic field lines in FIG. 13A. Similarly to the "circular" coupler, it is characterized by relatively weak coupling and displacement tolerance, but very low emission levels.

Figure 14:
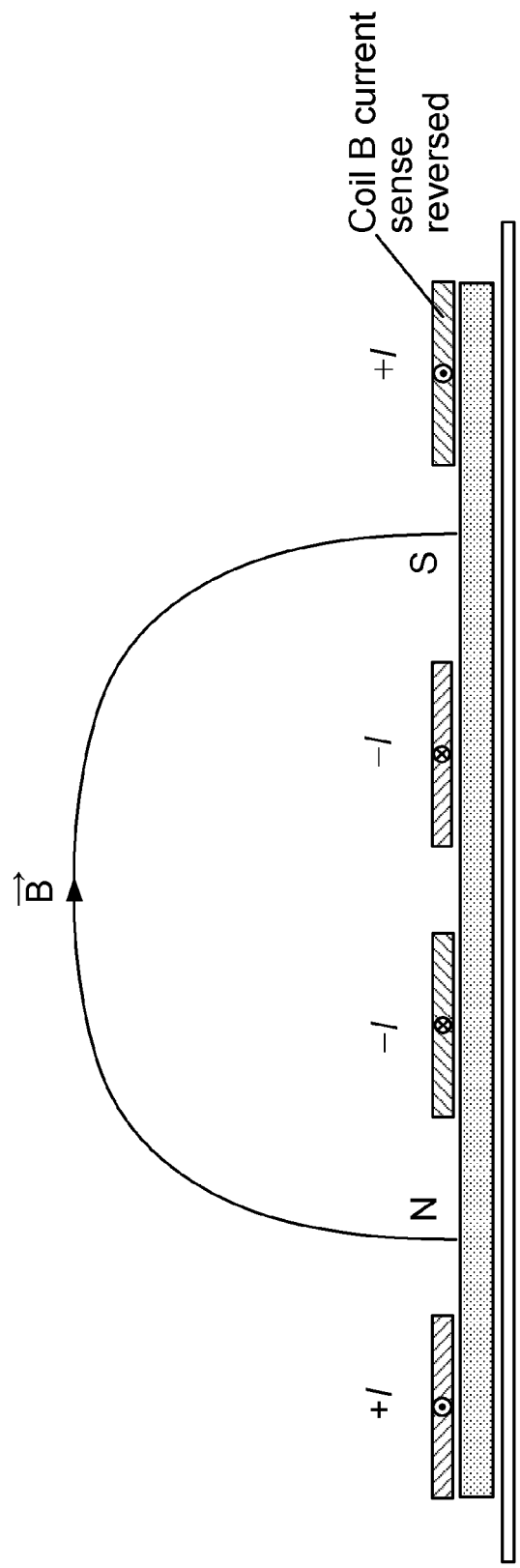
FIG. 14 schematically illustrates the cross-section of an IPT coupler topology in accordance with FIG. 13A but with the current direction of coil B reversed so that the magnetic flux device generates a 'horizontal' magnetic moment, indicated by two distinct magnetic pole areas (N) and (S) and a field line starting at one pole area and ending at the other pole area.

In step 5 of the metamorphosis, the current direction in coil B is reversed, as shown schematically in FIG. 14, leading to the "bi-polar" coupler operated in a horizontally polarized mode, as indicated by the two pole areas (N and S) and the field line. Changing current direction in one of the coils may cause certain behaviors that may be consistent with a "solenoid"-type coupler that generates the most pronounced horizontal magnetic moment of the various topologies depicted in FIGS. 8A-8B. Therefore, the characteristics of the "bi-polar" coupler change substantially. Coupling and tolerance increase, but emission levels do as well, since the conductive back plate exerts no stray field cancelling effect for horizontal field components. In contrast, use of a conductive back plate in the base pad and in the vehicle pad, or simply the presence of metallic structures in the vehicle underbody and ground (e.g., ferroconcrete), may be counterproductive in regards to emissions. Conductive back plates may be used to prevent excessive eddy current losses (e.g., induction heating) in a vehicle's steel underbody structure and in the steel rebar structure of a ferroconcrete ground. On the other hand, the use of a conductive back plate may substantially improve coupling in some horizontally polarized systems (e.g. "solenoid"-type) and can partially explain the high coupling coefficients of these coupler types as opposed to "circular"-type magnetic flux devices where metallic structures generally exert a negative impact on coupling and performance.

Figure 8B:
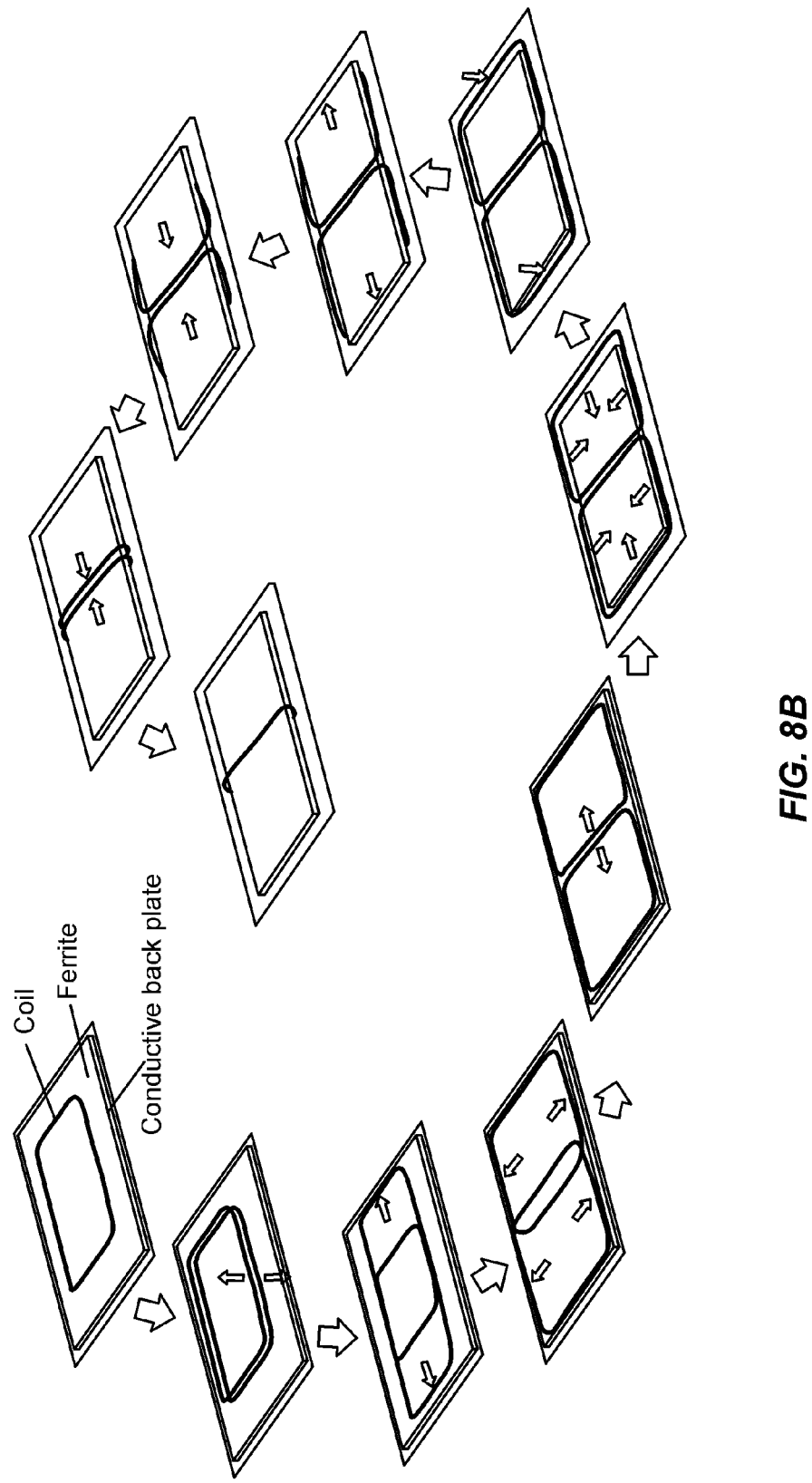
FIG. 8B schematically illustrates a process of metamorphosis from a "circular"-type coupler towards a "solenoid"-type coupler.
Figure 10:
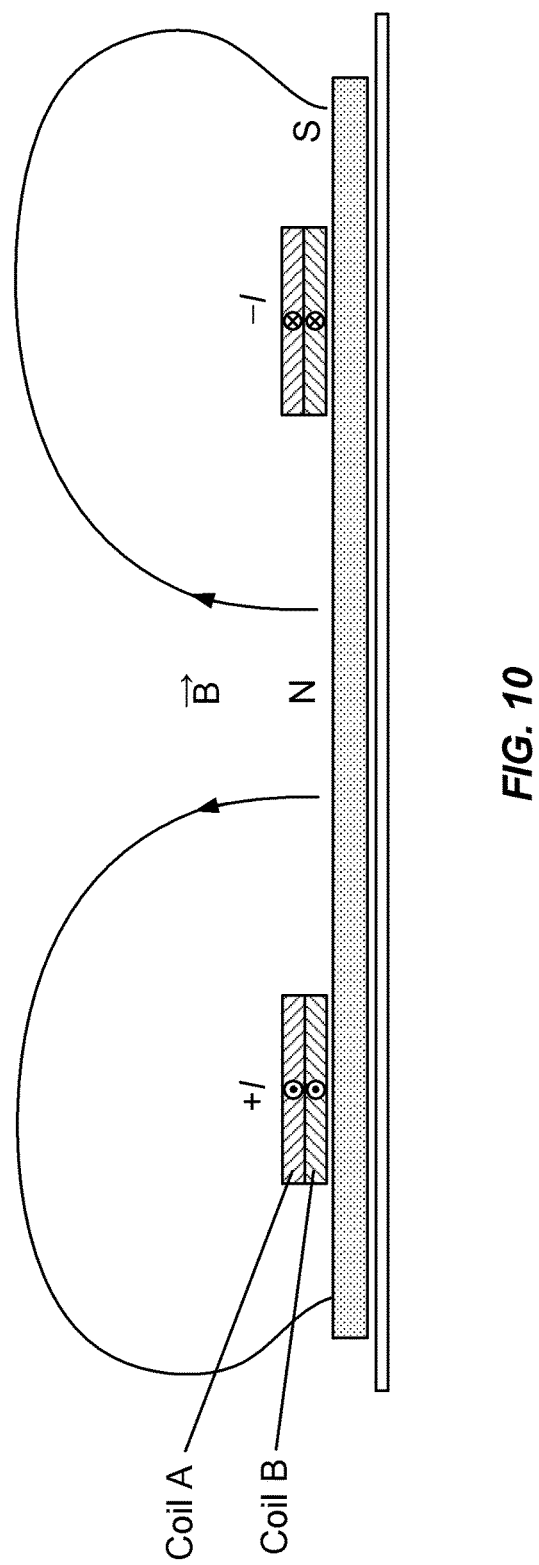
FIG. 10 schematically illustrates the cross-section of an IPT coupler in accordance with FIG. 9A with the coil split into two halves (e.g., coil A and coil B).
Figure 11:
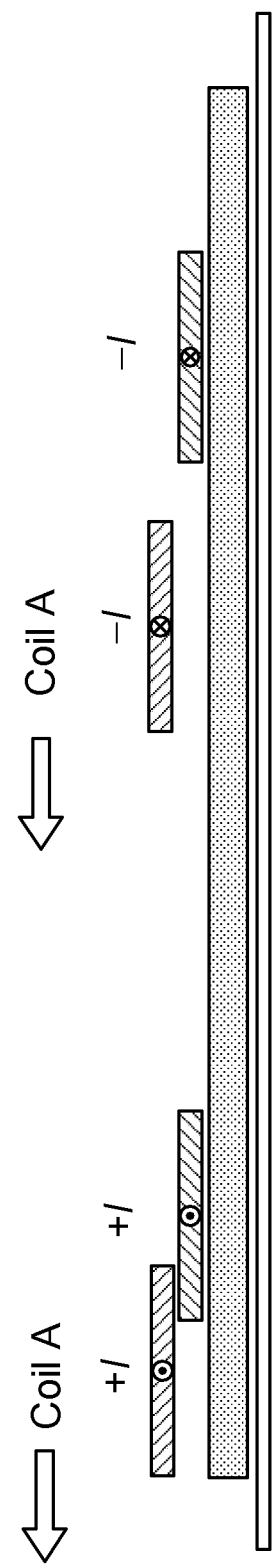
FIG. 11 schematically illustrates coil A moved to the left.
Figure 12:
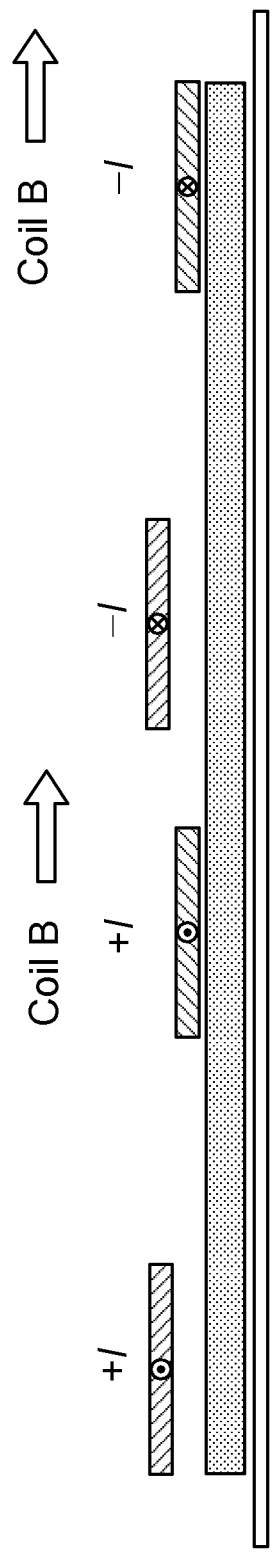
FIG. 12 schematically illustrates coil B moved to the right.
Figure 15:
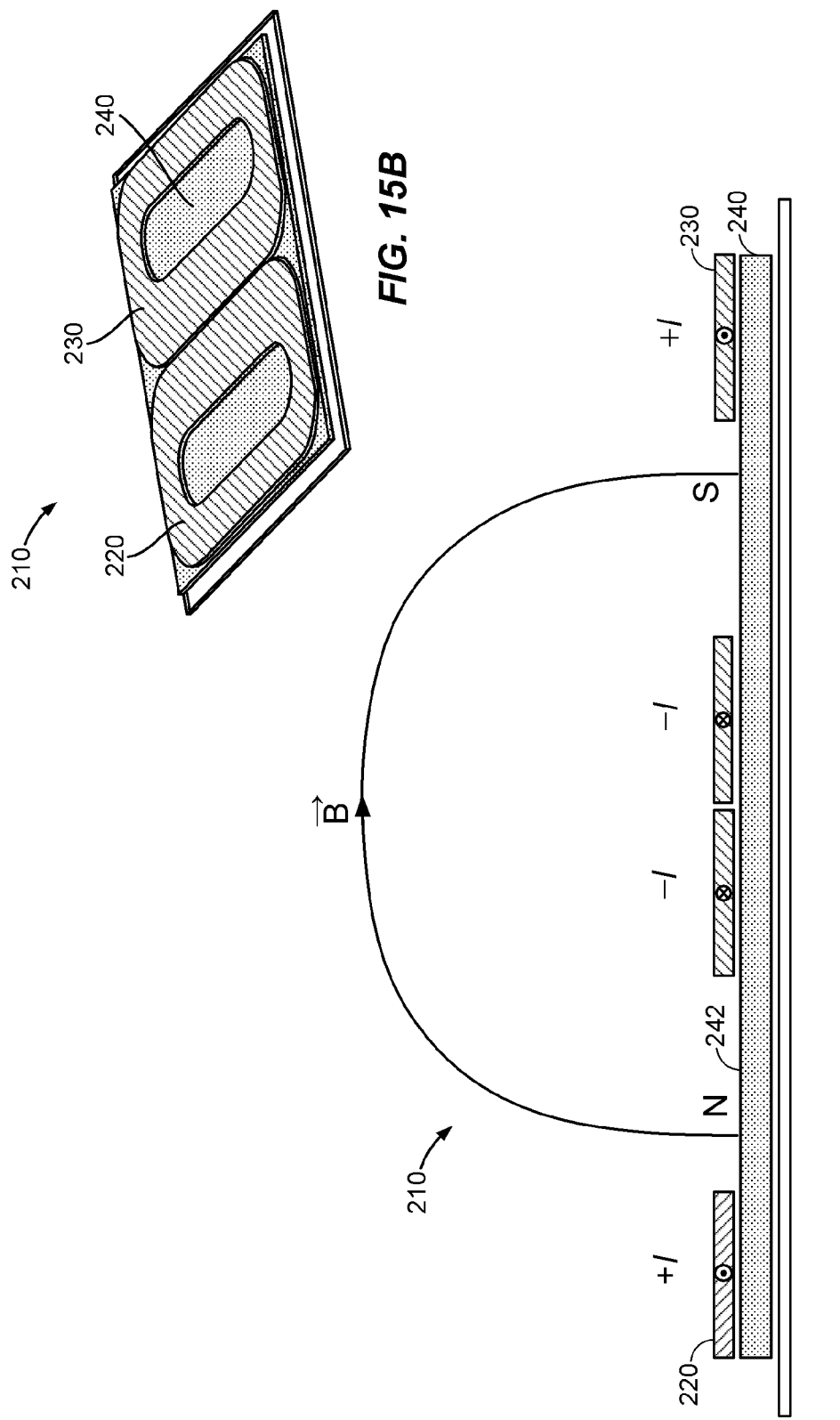
FIG. 15A schematically illustrates coil A and coil B further separated and somewhat contracted so that they do not overlap, as well as the current directions and a field line indicating a mode of operation that generates a horizontal magnetic moment.
FIG. 15B shows a perspective view of an IPT coupler model in accordance with FIG. 15A, and more specifically a so-called "double-D"-type magnetic flux device that is characterized by two non-overlapping coils having some mutual inductance and by a ferrite backing having essentially the same size as the "double-D"-type coil structure, termed the "double-D—full size ferrite" coupler topology.

FIGS. 15A-15B schematically illustrate the result of step 6 of the metamorphosis that modifies the two coils 220, 230 to become non-overlapping, leading to the topology termed the "double-D, full size ferrite" coupler, which is characterized by the outer horizontal dimensions of both the coils 220, 230 and the magnetically permeable material 240 (e.g., ferrite structure) being substantially equal to one another. In certain cases, this first variant of a "double-D" coupler may exhibit the lowest emission levels among all the "double-D" variants in the sequence as depicted in FIGS. 8A-8B, since it is 'closest' to the "circular"-type coupler. The "double-D, full size ferrite" topology can be useful for a charging base as it has the potential to provide solutions generating substantially lower emissions as compared to the "solenoid" topology or other variants of the "double-D" topology.

In the example structure shown in FIGS. 15A-15B, the first coil 220 has a first periphery (e.g., D-shaped) bounding a first area, the second coil 230 has a second periphery (e.g., D-shaped) bounding a second area, the magnetically permeable material 240 has a third periphery bounding a third area, and a ratio of the sum of the first area and the second area to the third area is in a range between 0.9 and 1.1. For example, the sum of the first area and the second area can be substantially equal to the third area. One or more portions (e.g., substantially straight portions) of the first periphery can be substantially aligned with one or more portions (e.g., substantially straight portions) of the third periphery, and one or more portions (e.g., substantially straight portions) of the second periphery can be substantially aligned with one or more portions (e.g., substantially straight portions) of the third periphery. For example, an outer horizontal dimension of the sum of the first coil 220 and the second coil 230 (e.g., a first length across the double-D coils from a substantially straight portion of the first periphery to an opposite and substantially straight portion of the second periphery) can be substantially equal to an outer horizontal dimension of the magnetically permeable material 240 (e.g., a second length across the third periphery substantially parallel to the first length). Other portions of the first periphery and the second periphery (e.g., curved portions, such as the corners of the D-shaped periphery) can deviate from the third periphery, such that the sum of the first area and the second area can be less than the third area.

In the example structure shown in FIGS. 15A-15B, the magnetically permeable material 240 is a monolithic ferrite plate having the third periphery and the third area. In certain other configurations, the magnetically permeable material 240 can comprise multiple magnetically permeable portions (e.g., plates, rods, blocks, tiles) which are mechanically coupled to one another to form the magnetically permeable material 240. These multiple magnetically permeable portions can be at least partially spaced from one another. For example, the magnetically permeable material 240 can comprise at least one region within the third area, with the at least one region comprising a non-magnetic and non-conductive material (e.g., air, plastic). The at least one region can comprise multiple regions that are adjacent to one another, multiple regions that are separate from one another (e.g., separated by a ferrite material or an electrically conductive material), or multiple regions of both. The at least one region can have a summed area (e.g., sum of the areas of the at least one region) that is less than 20% of the third area.

Figure 16:
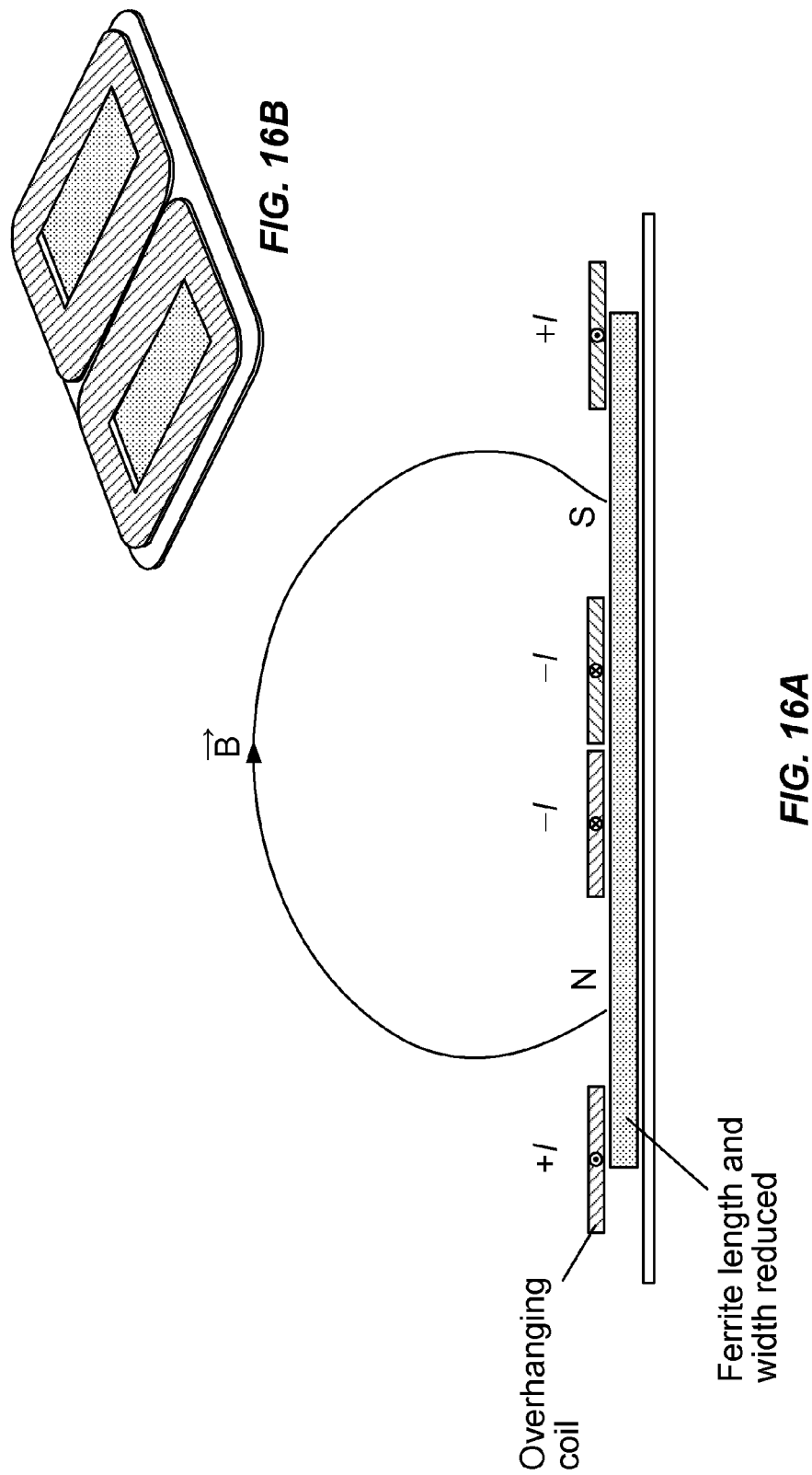
FIG. 16A schematically illustrates the cross-section of an IPT coupler similar to FIG. 15A but with a length and width of the ferrite backing made smaller so that the outer parts of the "double-D"-type coils are overhanging the ferrite backing.
FIG. 16B shows a perspective view of an IPT coupler model in accordance with FIG. 16A that is termed the "double-D, planar overhanging windings" coupler topology.

In step 7 of the metamorphosis schematically illustrated in FIGS. 16A-16B, the length and width of the ferrite structure are slightly shortened so that the planar "double-D" windings overhang the underlying ferrite structure. This topology is termed the "double-D, planar overhanging windings" coupler and corresponds with embodiments of a "double-D" coupler. This step may be considered as a preparatory measure for the following stages of metamorphosis where the coil windings are pulled over the ferrite. Reducing the size of the ferrite provides space for windings at the front faces of the ferrite under the given package form factor constraint. Interestingly, this modification on the ferrite increases coupling and tolerance but also emission levels relative to the preceding "double-D" variant (e.g., as depicted in FIGS. 13A-13B).

Figure 17:
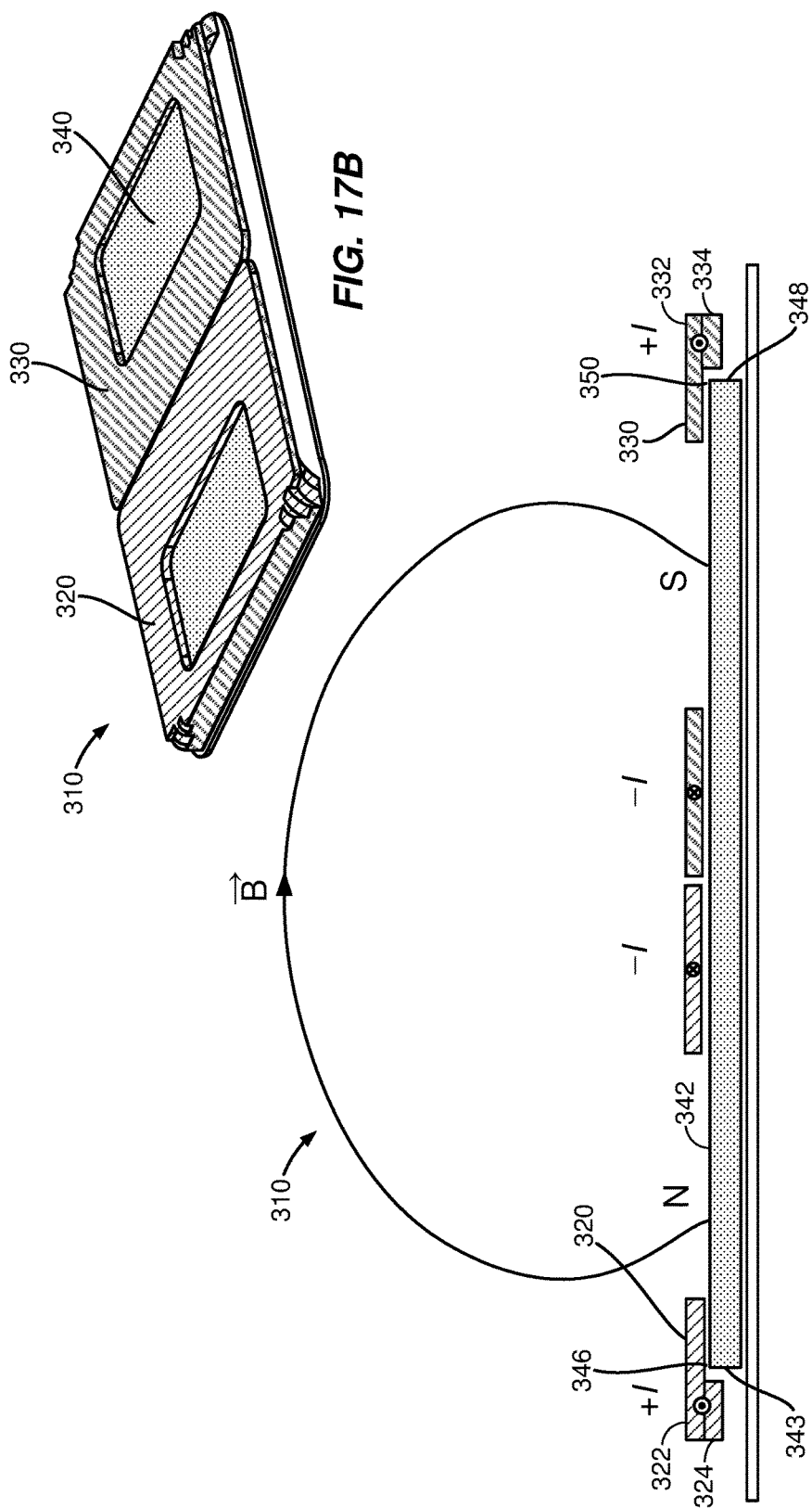
FIG. 17A schematically illustrates the outer segments of the "double-D"-type coil further moved out and folded so that windings at both front sides are stacked with windings below the plane of the surface of the ferrite backing and closer to the back plate.
FIG. 17B shows a perspective view of an IPT coupler model in accordance with FIG. 17A that is termed the "double-D, front stacked windings" coupler topology.

In step 8 on the way towards the "solenoid"-type coupler, the outer segments of the first and second coils 320, 330 (e.g., the "D-coils" of the "double-D" coil) are pulled over the front face of the magnetically permeable material 340 (e.g., ferrite structure). With a given magnetic flux device form factor constraint and coil copper cross-section, this step may be performed with the planar winding structure of the initial "double-D" coupler to be deformed into a multi-layer (e.g., stacked) winding structure, leading to another "double-D" variant termed the "double-D, front stacked windings" topology, an example of which is schematically depicted in FIGS. 17A-17B. A more detailed view of another example structure is provided in FIGS. 26A-26D.

This "double-D, front stacked windings" coupler can outperform the "double-D, planar overhanging windings" coupler in terms of coupling and tolerance, but can exhibit higher emission levels since it is found 'closer' to the "solenoid"-type coupler. This step of metamorphosis enlarges the coil openings and drops coil windings (e.g., at least some of the coil windings carrying the current through the first coil 320 and the second coil 330) below the first surface 342 of the magnetically permeable material 340 (e.g., ferrite structure), resulting in a shift of magnetic pole areas towards the ends of the magnetically permeable material 340 and hence a larger flux arch, as indicated in FIG. 17A. This modification may also increase eddy current losses as the windings get closer to the conductive back plate.

Figure 25:
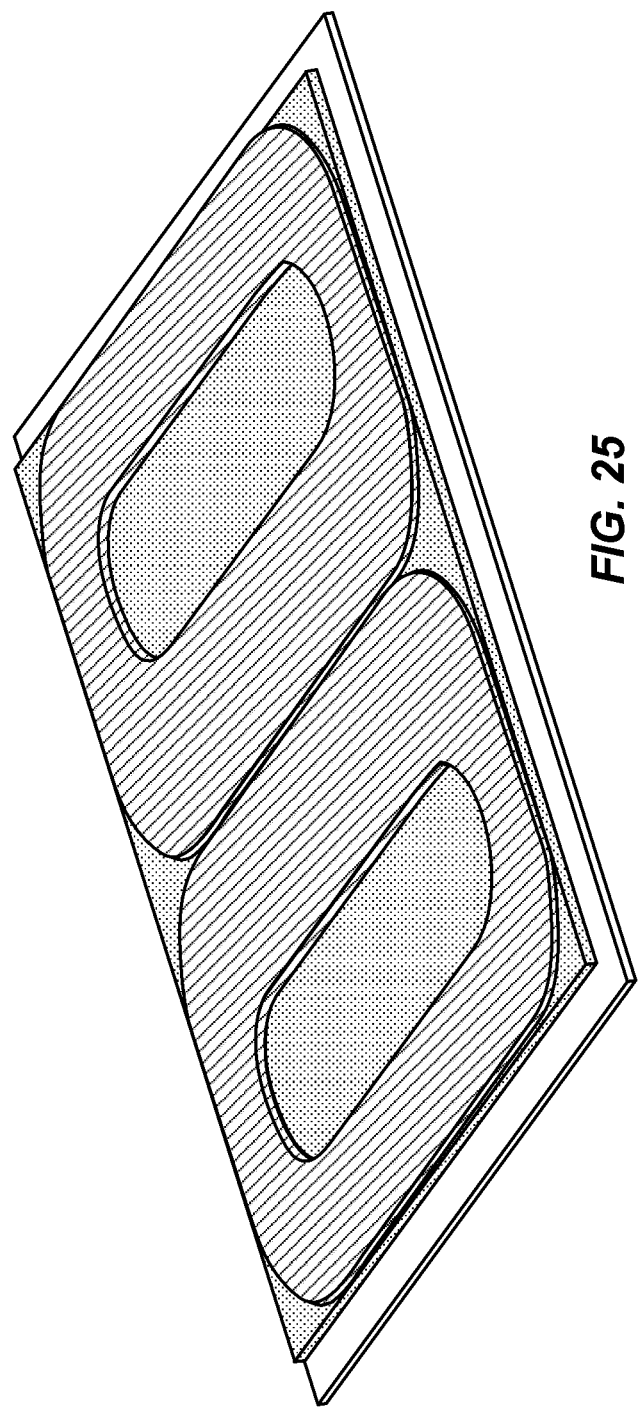
FIG. 25 shows a perspective view of a model of a variant of the "double-D"-type coupler with the coil size (overall length and width form factor) substantially the same as the size of the ferrite structure, which is termed the "double-D, full size ferrite" coupler.

This "double-D, front stacked windings" topology is particularly suitable for the use on the vehicle if there is a tight volume constraint for the vehicle package, resulting in a solution with a vehicle pad form factor considerably smaller than the base pad. A low emission-type "double-D" topology on the ground (e.g., the "double-D, full size ferrite"

magnetic flux device 210, examples of which are shown in FIGS. 15A-15B and 25) combined with a high coupling-type "double-D" coupler mounted on the vehicle (e.g., the "solenoid" or the "double-D, front stacked windings" magnetic flux device 310, an example of which is shown in FIGS. 17A and 17B) can provide a useful solution under these circumstances. The larger base pad can be the predominant source of emissions and the smaller vehicle pad can be mainly responsible for coupling and tolerance. Therefore, an approach using a topology that is emission-optimized for the base side and a topology that is coupling-optimized for the vehicle side may be useful as an optimum trade-off.

In the example structure shown in FIGS. 17A-17B, the first coil 320 comprises at least one spiral wound coil and the second coil 330 comprises at least one spiral wound coil. For example, the first coil 320 can comprise a plurality of conductive windings (e.g., the first layer 322 and the second layer 324) and the second coil 330 can comprise a plurality of conductive windings (e.g., the third layer 332 and the fourth layer 334). In certain embodiments, the first coil 320 and the second coil 330 are formed by a single conductive wire wound to form the two coils. The first coil 320 and the second coil 330 can both be adjacent to the magnetically permeable material 340 (e.g., without intervening material between the first and second coils 320, 330 and the magnetically permeable material 340 as shown in FIGS. 17A-17B, or with an intervening material). The first layer 322 of the first coil 320 can extend over a first half of the first surface 342 and the third layer 332 of the second coil 330 can extend over a second half of the first surface 342. The second layer 324 of the first coil 320 extends below the first surface 342 (e.g., intersects a plane of the first surface 342) and the fourth layer 334 of the second coil 330 extends below the first surface 342 (e.g., intersects a plane of the first surface 342). In certain embodiments, neither the first coil 320 nor the second coil 330 encircles the magnetically permeable material 340 (e.g., extends from over the first surface 342 to below a bottom surface of the magnetically permeable material 340 opposite to the first surface 342). As shown in FIGS. 17A-17B, the first coil 320 can extend from above the first surface 342 to below the first surface 342 (e.g., can intersect a plane of the first surface 342) and can be adjacent to the second surface 343 adjoined to the first surface 342 at a first edge 346 (e.g., extend over the first edge 346). In addition, the second coil 330 can extend from above the first surface 342 to below the first surface 342 (e.g., can intersect a plane of the first surface 342) and can be adjacent to the third surface 348 adjoined to the first surface 342 at a second edge 350 (e.g., extend over the second edge 350). In certain embodiments, the first edge 346 can be opposite to the second edge 350, as schematically shown in FIGS. 17A-17B.

In the example structure shown in FIGS. 17A-17B, the magnetically permeable material 340 is a monolithic ferrite plate. In certain other configurations, the magnetically permeable material 340 can comprise multiple magnetically permeable portions (e.g., plates, rods, blocks, tiles) which are mechanically coupled to one another to form the magnetically permeable material 340. These multiple magnetically permeable portions can be at least partially spaced from one another. For example, the magnetically permeable material 340 can comprise at least one region comprising a non-magnetic and non-conductive material (e.g., air, plastic). The at least one region can comprise multiple regions that are adjacent to one another, multiple regions that are separate from one another (e.g., separated by a ferrite material or an electrically conductive material), or multiple regions of both. The at least one region can have a summed area (e.g., sum of the areas of the at least one region) that is less than 20% of a total area of the magnetically permeable material 340.

In certain embodiments, the first layer 322 of the first coil 320 has a first inner periphery bounding a first region, and the third layer 332 of the second coil 330 has a second inner periphery bounding a second region. A first center point of the first region and a second center point of the second region can be closer to the first edge 346 and the second edge 350, respectively, than to a center point of the magnetically permeable material 340. In certain embodiments, a first geometric plane defined by at least one turn of each of the first coil 320 and the second coil 330 in the first layer 322 and the third layer 332, respectively, is parallel to the substantially planar first surface 342.

Figure 26B:
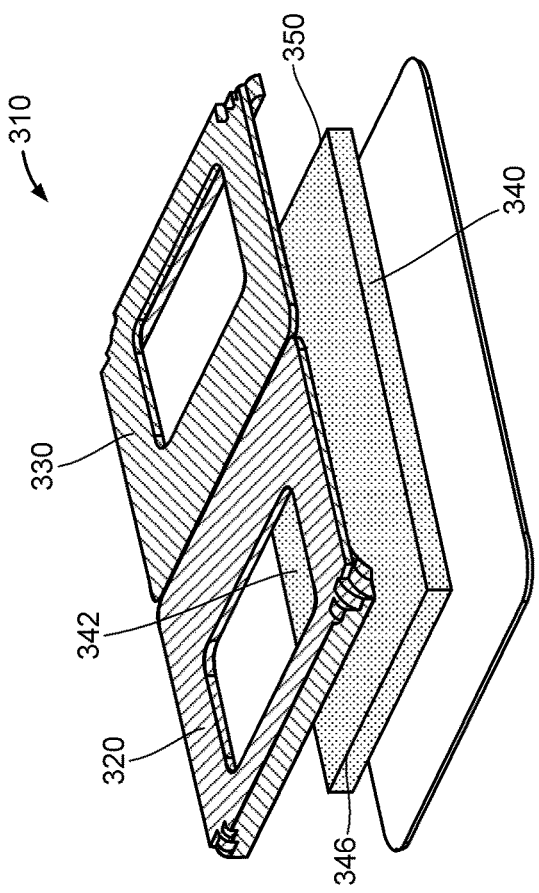
FIGS. 26A-26C shows a transparent top-down view, a perspective cut view, and an explosion view, respectively, of a model of the "double-D, front stacked windings" magnetic flux device.
Figure 26A:
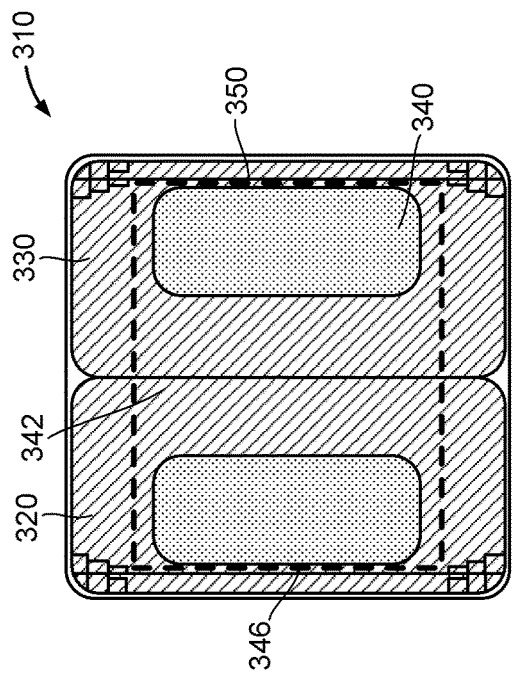
Figure 26C:
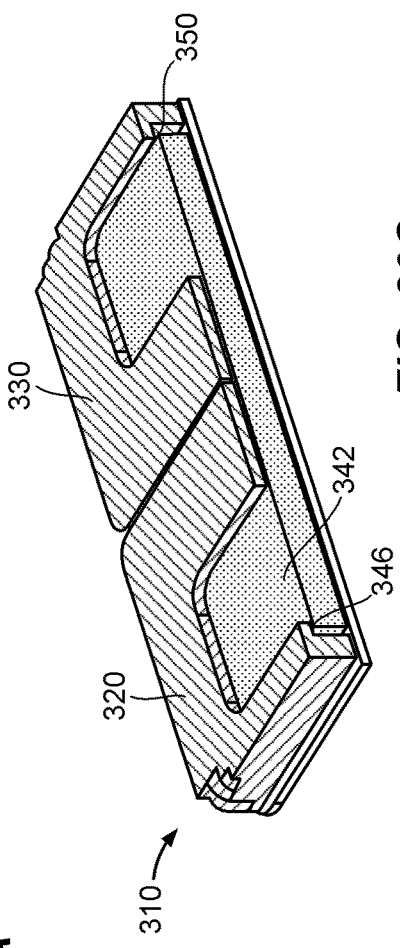
Figure 26D:
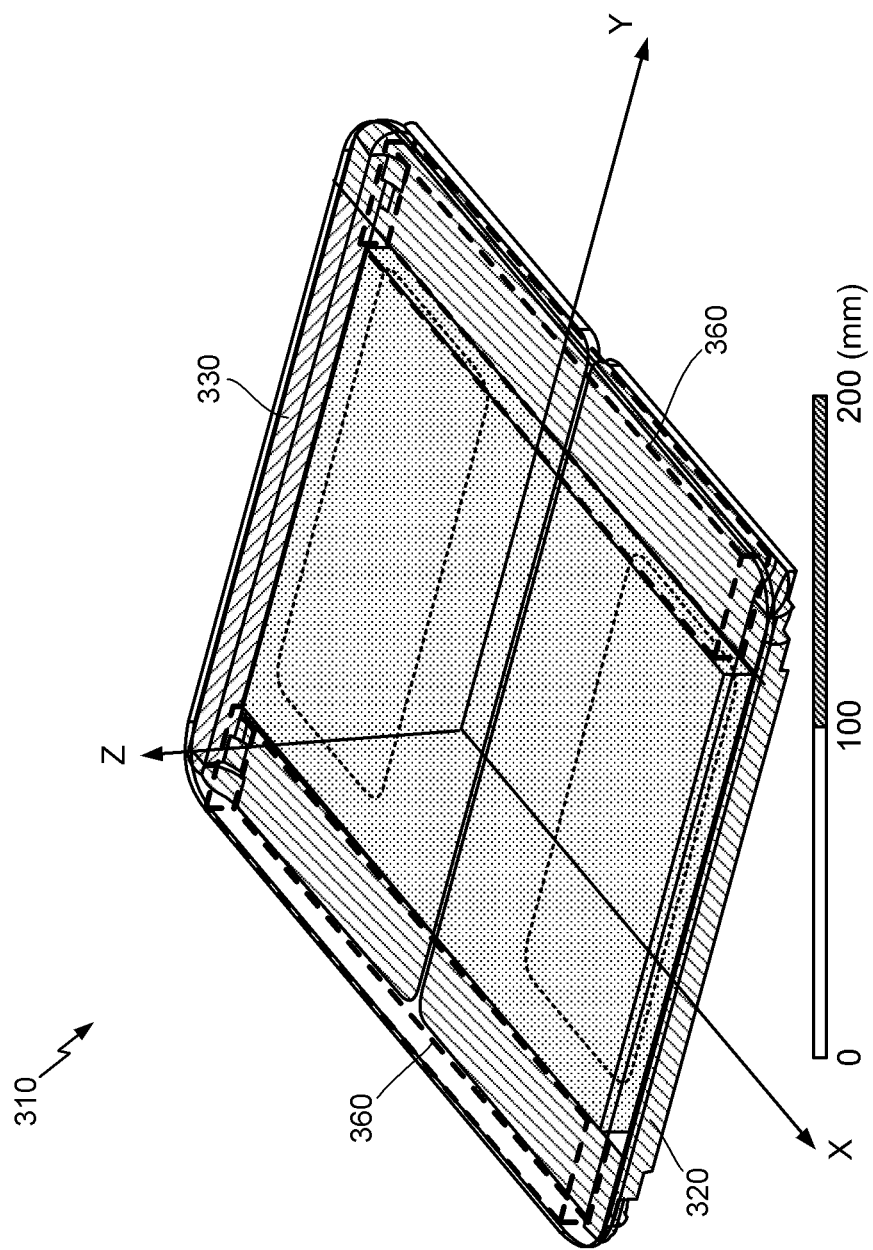
FIG. 26D shows a potential space for electronics in a small vehicle package integrated solution using a "double-D, front stacked winding" magnetic flux device.

FIGS. 26A-26C shows a transparent top-down view, a perspective cut view, and an explosion view, respectively, of a model of the "double-D, front stacked windings" coupler magnetic flux device 310 in accordance with certain embodiments described herein. By virtue of the first coil 320 extending over the first edge 346 and intersecting a plane of the first surface 342 and the second coil 330 extending over the second edge 350 and intersecting the plane of the first surface 342, certain embodiments described herein provide a potential space for electronics in a small vehicle package integrated solution using a "double-D, front stacked winding" coupler magnetic flux device 310. A bottom-view of an example of such a magnetic flux device 310 is shown schematically by FIG. 26D. The magnetic flux device 310 comprises one or more regions 360 bounded at least in part by the first coil 320, the second coil 330, and the magnetically permeable material 340. The one or more regions 360 of FIG. 26D are positioned on opposite sides of the magnetically permeable material 340 below the undersides of the first coil 320 and the second coil 330. These regions can be configured to contain electronic components (e.g., power conversion electronics and sensor electronics of the magnetic flux device 310).

Figure 18:
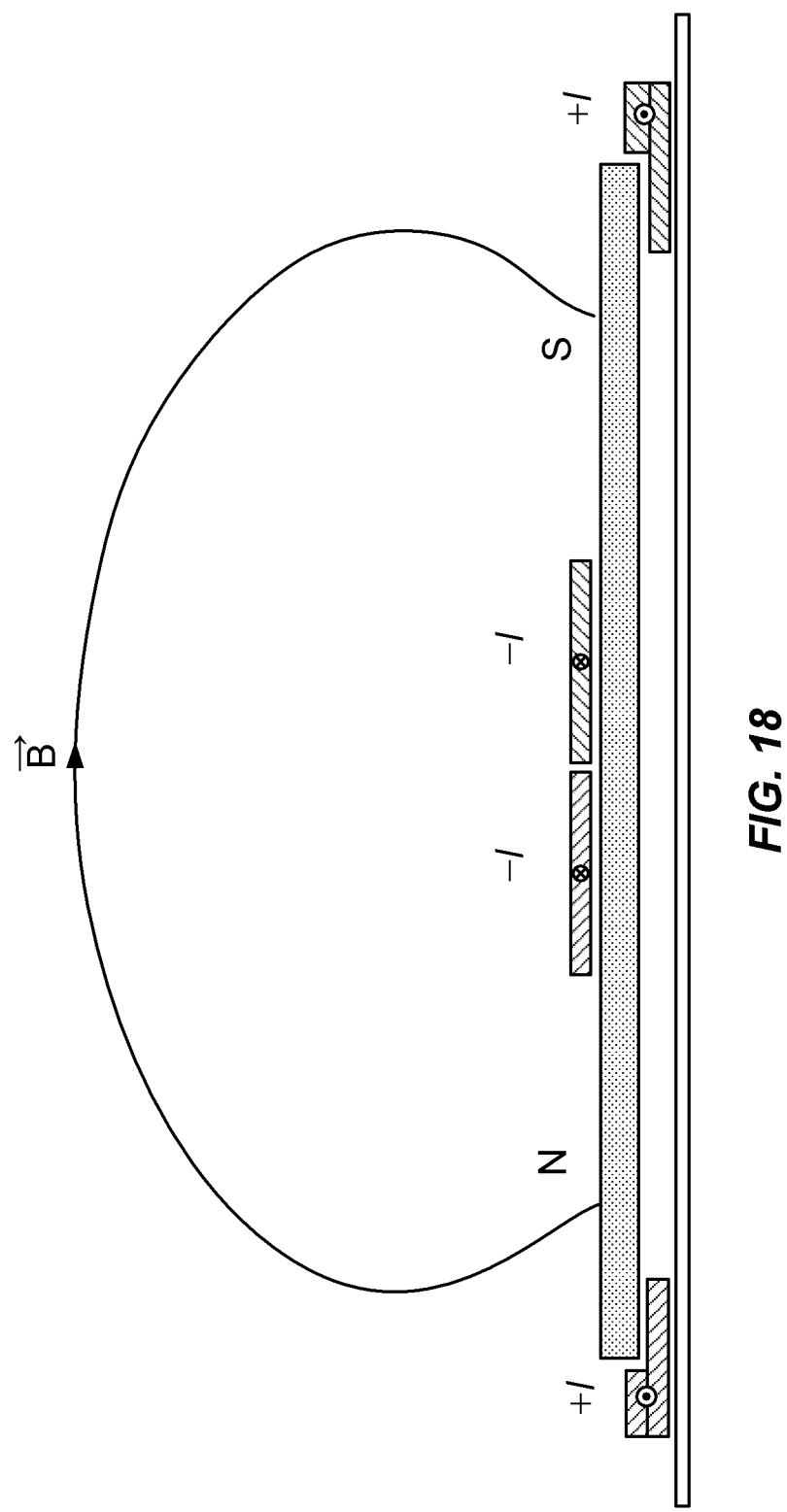
FIG. 18 schematically illustrates the coils of the "double-D, front stacked windings" coupler topology on opposite side of the ferrite structure and the air gap between ferrite and back plate increased, which is termed the "double solenoid, front stacked windings" coupler topology.
Figure 19:
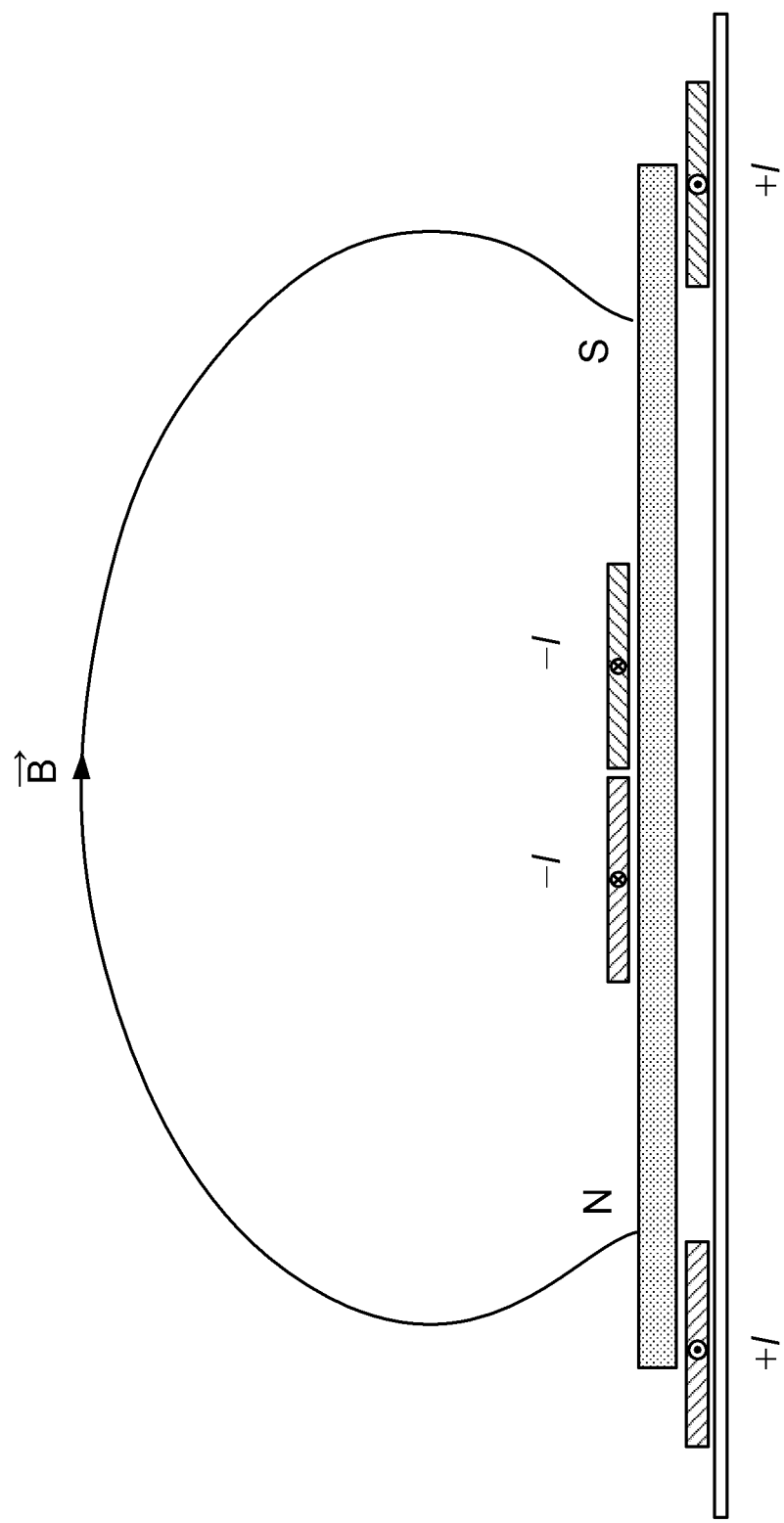
FIG. 19 schematically illustrates the bottom segments of the coils unfolded to a single layer winding and slightly moved towards the center of the magnetic flux device, which may be considered as two oblique solenoid coils and is termed the "double solenoid, oblique windings" coupler topology.

Continuing the metamorphosis of the "double-D" with steps 9 and 10, the outer segments of the "double-D" windings can be completely pulled over the front faces of the ferrite and the ferrite can be lifted up, making room for windings below the ferrite. The resulting new topology, depicted in FIG. 18, can be considered a variant of a "solenoid"-type coupler since the coils are wound around a ferrite core. However, the two coils are very oblique and are still with front stacked windings, which is termed the "double solenoid, front stacked windings" topology. This step may also include reducing the thickness of the coils and/or the ferrite structure if the overall height of the magnetic flux device is to be maintained (not shown in FIG. 18). Additionally, the outer windings segments can now be very close to the back plate and may have a negative impact on the Q-factor of the coils. On the other hand, coupling may be substantially increased, partially compensating for the loss in Q-factor and still resulting in an acceptable efficiency.

Figure 20:
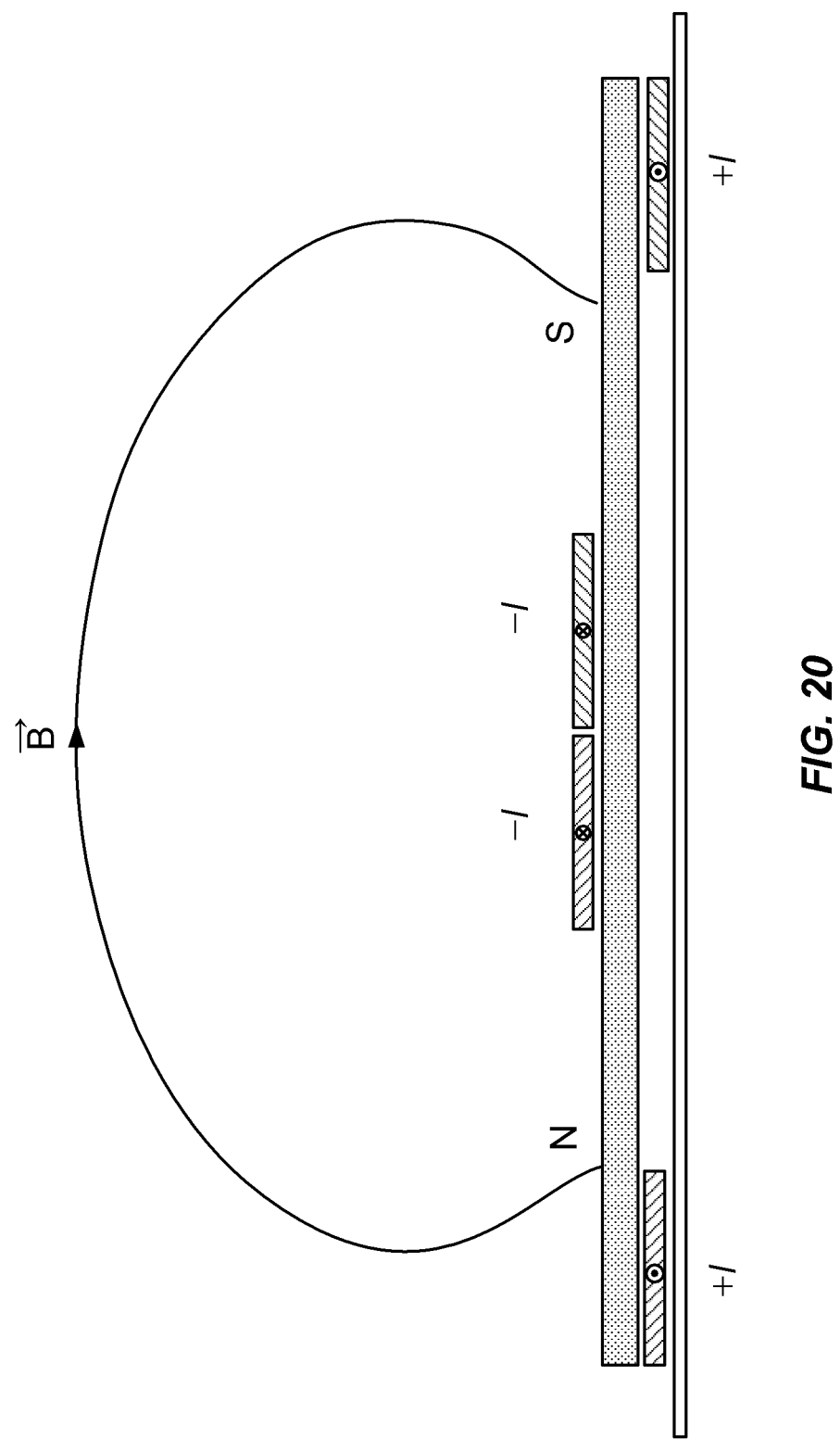
FIG. 20 schematically illustrates the cross-section of the IPT coupler topology of FIG. 19 but with the length of the ferrite increased to match the size of the coil structure, which is termed the "double solenoid, oblique windings, full size ferrite" coupler topology.
Figure 21:
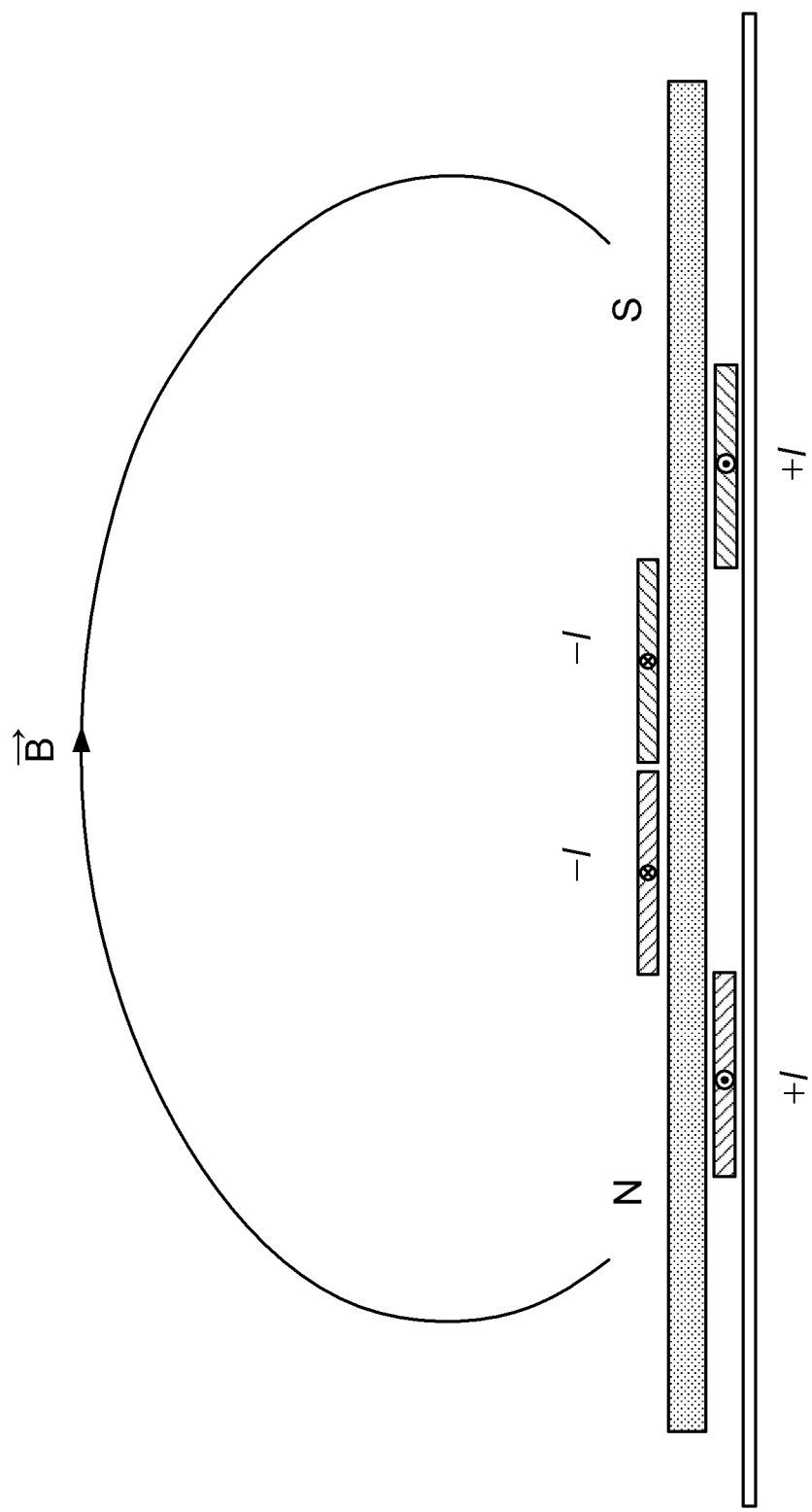
FIG. 21 schematically illustrates the two oblique solenoid coils further contracted and moved towards the center, which is termed the "double solenoid, slightly oblique windings" coupler topology.
Figure 24:
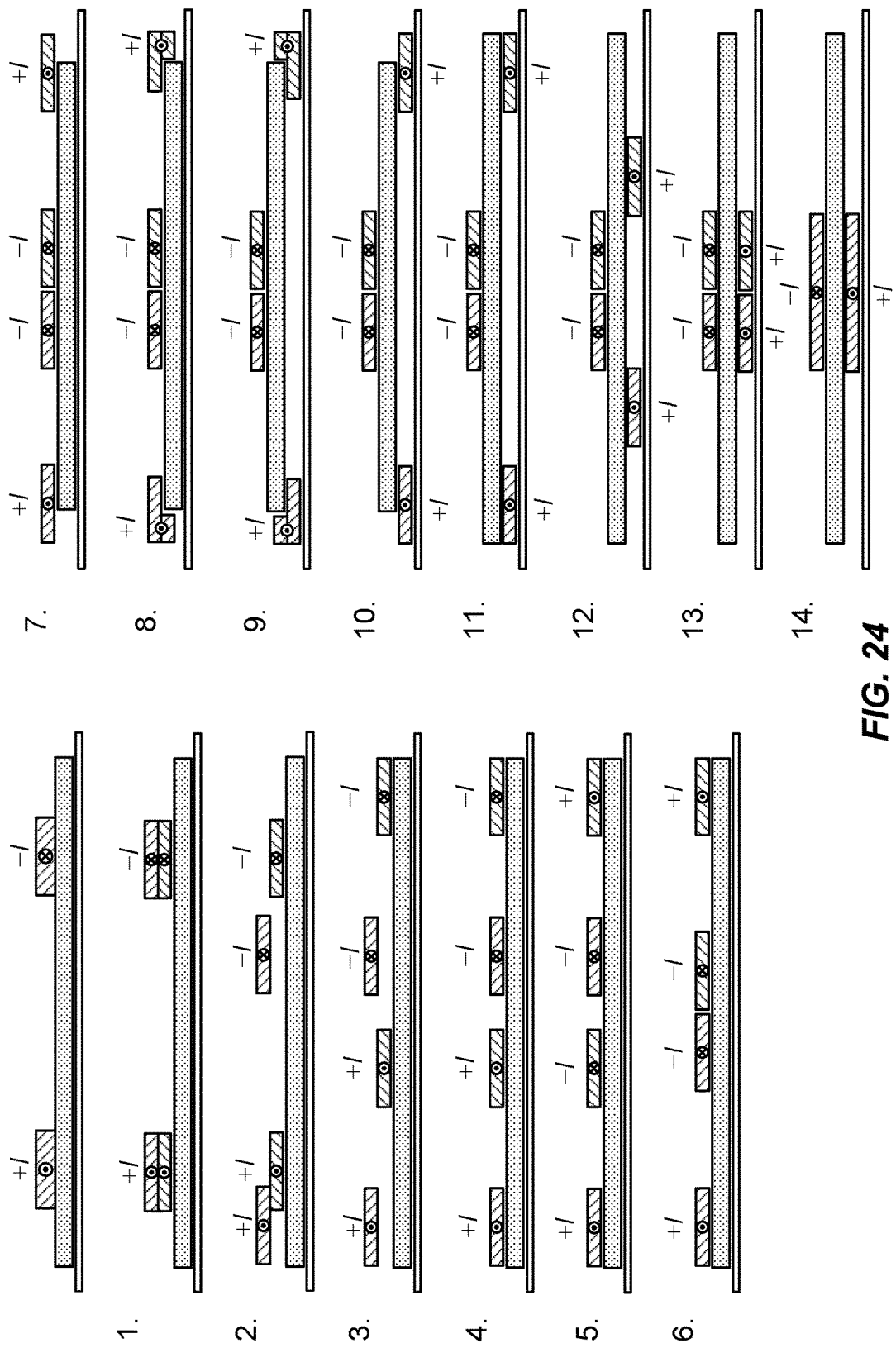
FIG. 24 schematically illustrates an overview of all the steps of metamorphosis as depicted in the previous figures with step numbers indicated.

In the following steps (step 11, 12, 13, and 14), the two solenoid coils are successively contracted (e.g., shrunk), keeping the center segments (above ferrite) fixed so that the coil segments below the ferrite are moving step by step towards the center of the magnetic flux device. This process of metamorphosis can generate some variants of "double solenoid" topologies and finally end up in the "solenoid" topology. In step 10, the bottom coil segment is unfolded (e.g., all windings in a single plane), resulting in a variant that is schematically depicted in FIGS. 19A-19D and termed "double solenoid, oblique windings". In step 11, the length of the ferrite is increased to its 'full size' resulting in a topology termed "double solenoid, oblique windings, full size ferrite," as schematically depicted in FIGS. 20A-20C. This topology may be considered in analogy to the "double-D, full size ferrite" coupler (see, e.g., FIGS. 15A-15B and 25). In steps 12 and 13, the coils are further contracted, leading first to the "double solenoid, slightly oblique" coupler (see, e.g., FIGS. 20A-20C) and then to the "double solenoid, coils adjacent" coupler. Finally, in step 14, the two coils are merged into a single "solenoid" topology, the topology that provides the strongest coupling but also the highest emission levels among all the topologies shown in FIGS. 8A-8B.

In certain embodiments, a further advantage of a "double-D front stacked windings" configuration with a reduced ferrite structure and stacked windings (e.g., examples of which is schematically illustrated by FIGS. 17A-17B and FIGS. 26A-26D) may be found when designing a so-called cross-polar coupler (referred to as a "DDQ" coil arrangement) that integrates both a "double-D" (DD) coil and a "circular" coil, referred to herein as a "quadrature" (Q) coil, such that the "DDQ" coil is able to pick-up both vertical and horizontal flux components. The cross-polar coupler has the potential of providing more displacement tolerance in both the x and y direction at the same time. This concept may also apply to the base (e.g., primary) side. In addition, as described more fully below, the cross-polar coupler or "DDQ" coil arrangement may be useful to exploit the available space to the maximum extent possible (e.g., by leaving only a minimum air space open).

FIGS. 27A-27C schematically illustrate an example magnetic flux device 410 (e.g., a cross-polar coupler or "DDQ" coil arrangement) for wirelessly receiving or transmitting power from or to a space beyond the magnetic flux device 410. The magnetic flux device 410 comprises a first conductive structure 420 (e.g., a "DD-coil") configured to wirelessly receive or transmit power via a magnetic field. The first conductive structure 420 comprises a first coil 422 (e.g., a first D-coil) having a first lower surface and a second coil 424 (e.g., a second D-coil) having a second lower surface. The first lower surface of the first coil 420 is substantially coplanar with the second lower surface of the second coil 430. The first conductive structure 420 has a first length ($L_1$) and a first width ($W_1$) that are both substantially parallel to the first and second lower surfaces, and the first length is greater than the first width. The magnetic flux device 410 further comprises a second conductive structure 440 (e.g., a Q-coil) configured to wirelessly receive or transmit power via the magnetic field. The second conductive structure 440 has a second length ($L_2$) and a second width ($W_2$) both substantially parallel to the first and second lower surfaces, and the second length is substantially parallel to the first length and is greater than the second width. At least a first planar portion 426 of the first conductive structure 420 is substantially coplanar with a second planar portion 436 of the second conductive structure 430.

In certain embodiments, the first conductive structure 420 comprises a first layer of one or more conductive windings defining a first geometric plane that is parallel to and in a different layer than a substantially planar surface of the second conductive structure 440 and the first conductive structure 420 further comprises a second layer of one or more conductive windings defining a second geometric plane that at least partially intersects (e.g., is coplanar with) a third geometric plane defined by the substantially planar surface. The first conductive structure 420 can have a first inner periphery bounding a first region, and the second conductive structure 440 can have a second inner periphery bounding a second region, wherein one or more conductive windings of the second conductive structure 440 are positioned within the first and second regions and are substantially coplanar with the first layer and positioned in a different layer than the second layer.

In certain embodiments, as schematically shown in FIGS. 27A and 27C, the first conductive structure 420 (e.g., the first coil 422 and the second coil 424) and the second conductive structure 440 are configured to substantially completely cover a substantially planar surface 442 of the magnetically permeable material 440. In certain embodiments, as schematically shown in FIGS. 27A-27C, the first conductive structure 420 and the second conductive structure 430 are stacked on one another. As can be seen in FIG. 27C, the first planar portion 426 of the first conductive structure 420 at least partially bounds at least one region containing the second planar portion 436 of the second conductive structure 430. In certain such embodiments, the magnetic flux device 410 advantageously provides an optimum space utilization by exploiting the available space to the maximum extent possible (e.g., by leaving only a minimum air space open).

In certain embodiments, as schematically shown in FIG. 27A, the first length is greater than the second length, and the first width is substantially equal to the second width. In certain embodiments, the first coil 422 and the second coil 424 enclose a first area and a second area, respectively, and the second conductive structure 430 encloses a third area. The first conductive structure 420 can have a first edge and a second edge each intersecting a first geometric line running along the first length of the first conductive structure 420. In certain embodiments, the first geometric line runs along the second length of the second conductive structure 430 as well, while in certain other embodiments, the first geometric line is substantially parallel to a second geometric line which runs along the second length of the second conductive structure 430. In certain embodiments, the magnetic flux device 410 comprises one or more regions bounded at least in part by the first conductive structure 420, the second conductive structure 430, and the magnetically permeable material 440. The one or more regions can be positioned on opposite sides of the magnetically permeable material 440 below the undersides of the first conductive structure 420 and the second conductive structure 430. These regions can be configured to contain electronic components (e.g., power conversion electronics and sensor electronics of the magnetic flux device 410).

To accommodate a "DDQ" coil arrangement (e.g., as schematically illustrated in FIGS. 27A-27C), it can be useful to exploit the available space to the maximum extent possible (e.g., by leaving only a minimum air space open). Optimum utilization of the available space for ferrite and copper (e.g., Litz wire) may be particularly useful for tight form factor constraints (e.g., for the vehicle package). Therefore, filling the space at the front faces of the ferrite with stacked windings can be a useful approach with a positive effect in regards to both coupling and space utilization. It can provide enough room for embedding the 'Q' coil in the openings of the 'DD' coil, and in the same plane directly on top of the ferrite structure, as shown in the perspective cut view of FIG. 27C. This approach can be useful for a low profile magnetic flux device solution. Due to the reduced size ferrite, there can also be some space on each side of the magnetic flux device to accommodate the side segments of the 'DD' and 'Q' coil windings which are on top of each other. An optimum utilization of the space at the side of the ferrite may be achieved with a staggered and stacked coil windings, as can be seen in FIG. 27B.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for flowing at least one electric current, or means for conducting current may comprise an electrically conductive coil. In addition, means for modifying or channeling magnetic flux may comprise a magnetically permeable material. In addition, means for wirelessly transmitting or receiving power may comprise a wireless power transmitter or receiver.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A magnetic flux device configured to transmit or receive magnetic flux to or from a space beyond the magnetic flux device, the magnetic flux device comprising:
   at least a first electrically conductive coil and a second electrically conductive coil, the first coil having a first layer and second layer, the second coil having a third layer and fourth layer, the first layer substantially coplanar with the third layer; and
   a magnetically permeable material having:
      a substantially planar first surface,
      a second surface adjoined to the first surface at a first edge, and
      a third surface adjoined to the first surface at a second edge, the first coil extending over the first edge and intersecting a plane of the first surface, the second coil extending over the second edge and intersecting the plane of the first surface, wherein a first geometric plane defined by at least one turn of each of the first and second coils in the first and third layers, respectively, is parallel to the substantially planar first surface.

2. The magnetic flux device of claim 1, wherein the first coil comprises at least one spiral wound coil and the second coil comprises at least one spiral wound coil.

3. The magnetic flux device of claim 1, wherein the first edge is opposite to the second edge.

4. The magnetic flux device of claim 1, wherein the first coil is adjacent to the magnetically permeable material and the second coil is adjacent to the magnetically permeable material.

5. The magnetic flux device of claim 1, wherein the magnetically permeable material comprises a ferrite plate.

6. The magnetic flux device of claim 1, wherein the first layer and the second layer comprise stacked windings of the first coil and the third layer and the fourth layer comprise stacked windings of the second coil.

7. The magnetic flux device of claim 1, wherein the first layer of the first coil extends over a first half of the first surface and the third layer of the second coil extends over a second half of the first surface.

8. The magnetic flux device of claim 1, wherein the first coil does not encircle the magnetically permeable material and the second coil does not encircle the magnetically permeable material.

9. The magnetic flux device of claim 1, wherein the first layer and the second layer comprise a plurality of layers of conductive windings.

10. The magnetic flux device of claim 1, wherein the first coil and the second coil form a first conductive structure having at least a first planar portion, the magnetic flux device further comprising a second conductive structure configured to wirelessly receive or transmit power via the magnetic field, the second conductive structure having at least a second planar portion substantially coplanar with the first planar portion.

11. The magnetic flux device of claim 10, wherein the first conductive structure and the second conductive structure are configured to substantially completely cover the first surface of the magnetically permeable material.

12. The magnetic flux device of claim 10, wherein the first conductive structure, the second conductive structure, and the magnetically permeable material at least partially bound a region configured to contain electronic components.

13. The magnetic flux device of claim 10, wherein the first conductive structure and the second conductive structure are stacked on one another.

14. The magnetic flux device of claim 10, wherein the first planar portion at least partially bounds at least one region containing the second planar portion.

15. The magnetic flux device of claim 1, wherein the first layer of the first coil has a first inner periphery bounding a first region, and wherein the third layer of the second coil has a second inner periphery bounding a second region.

16. The magnetic flux device of claim 15, wherein a first center point of the first region and a second center point of the second region are closer to the first and second edges, respectively, than to a center point of the magnetically permeable material.

17. A magnetic flux device configured to transmit or receive magnetic flux to or from a space beyond the magnetic flux device, the magnetic flux device comprising:
  means for flowing at least one electric current, the flowing means comprising at least a first electrically conductive coil and a second electrically conductive coil, the first coil having a first layer and second layer, the second coil having a third layer and fourth layer, the first layer substantially coplanar with the third layer;
  means for modifying magnetic flux generated by the at least one electric current or which generates the at least one electric current,
  wherein the modifying means comprises a magnetically permeable material having a substantially planar first surface, a second surface adjoined to the first surface at a first edge, and a third surface adjoined to the first surface at a second edge, wherein the first coil extends over the first edge and intersects a plane of the first surface, and the second coil extends over the second edge and intersects the plane of the first surface, and
  wherein a first geometric plane defined by at least one turn of each of the first and second coils in the first and third layers, respectively, is parallel to the substantially planar first surface.

* * * * *